United States Patent
Henry

(10) Patent No.: US 8,666,054 B2
(45) Date of Patent: *Mar. 4, 2014

(54) TECHNIQUE FOR CONTINUALLY ASSISTING A USER DURING AN INFORMATION ASSISTANCE CALL

(75) Inventor: Gary E. Henry, Tigard, OR (US)

(73) Assignee: Grape Technology Group, Inc., Bethlehem, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/534,705

(22) Filed: Jun. 27, 2012

(65) Prior Publication Data

US 2013/0163743 A1    Jun. 27, 2013

Related U.S. Application Data

(63) Continuation of application No. 12/979,331, filed on Dec. 28, 2010, now Pat. No. 8,295,466, which is a continuation of application No. 11/115,940, filed on Apr. 27, 2005, now Pat. No. 7,929,681.

(51) Int. Cl.
*H04M 3/42* (2006.01)

(52) U.S. Cl.
USPC ............ 379/218.01; 379/76; 379/218.02; 379/221.05; 379/223

(58) Field of Classification Search
USPC ......... 379/218.01, 221.01, 221.04–223, 228
See application file for complete search history.

(56) References Cited

U.S. PATENT DOCUMENTS

| | | | |
|---|---|---|---|
| 6,580,904 B2 | 6/2003 | Cox et al. | |
| 6,754,326 B2 * | 6/2004 | Cox et al. | 379/218.01 |
| 6,775,371 B2 | 8/2004 | Elsey et al. | |
| 7,187,761 B2 | 3/2007 | Bookstaff | |
| 7,738,878 B2 | 6/2010 | Fan et al. | |
| 2002/0029178 A1 | 3/2002 | Wiederin et al. | |
| 2002/0057784 A1 | 5/2002 | Cox et al. | |
| 2002/0085702 A1 | 7/2002 | Cox et al. | |
| 2002/0136381 A1 | 9/2002 | Shaffer et al. | |
| 2003/0223563 A1 * | 12/2003 | Wolmuth | 379/218.01 |
| 2004/0170260 A1 | 9/2004 | Baker | |
| 2004/0247092 A1 | 12/2004 | Timmins et al. | |
| 2006/0046740 A1 | 3/2006 | Johnson | |
| 2006/0173915 A1 | 8/2006 | Kliger et al. | |
| 2006/0245576 A1 | 11/2006 | Henry | |

* cited by examiner

*Primary Examiner* — Duc Nguyen
*Assistant Examiner* — Assad Mohammed
(74) *Attorney, Agent, or Firm* — Sofer & Haroun, LLP

(57) ABSTRACT

Telephone users desiring directory assistance services are connected via standard telephone procedures to a directory assistance provider, such as an operator. An operator provides the destination number and initiates a connection to that number. Once that connection is initiated, the connection is monitored for the occurrence of a predetermined condition, such as a busy signal. If no such condition is detected, the caller proceeds with the call in the normal manner. If, however, such a condition is detected, the caller is automatically transferred to a directory assistance provider for further help.

7 Claims, 14 Drawing Sheets

CALL HANDLING PREFERENCES

1520 —— MARY

1530 —— SPANISH

1540 —— PERSONAL INTERESTS

| | |
|---|---|
| MUSIC: | BEATLES, ROLLING STONES, ... |
| FASHION: | VERSACE, DONNA KARAN, ... |
| SPORTS EVENTS: | KNICKS BASKETBALL GAMES, PGA GOLF TOURNAMENTS, ... |
| CUISINE: | ITALIAN |

1550 —— INFORMATION DELIVERY METHOD PREFERENCES

| | |
|---|---|
| VOICE MAIL: | 555-432-1012 |
| WAP SITE: | WAP411.COM/USR |
| e-mail: | usr@aol.com |

ADVERTISEMENTS AND PROMOTIONS

CALL-CONTEXT BASED ADVERTISING ☐ OPT OUT ⟵ 1555

1570 —— MESSAGE LIMIT    1 EVERY 5 CALLS

USAGE LIMITS

1560 —— ENTERTAINMENT RELATED SERVICES    $200/MONTH

1565 —— FOOD AND BEVERAGES    $10/TRANSACTION

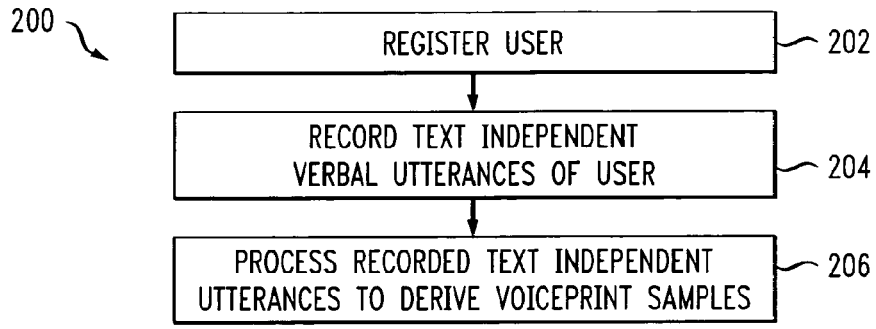

FIG. 12

- REGISTER USER — 202
- RECORD TEXT INDEPENDENT VERBAL UTTERANCES OF USER — 204
- PROCESS RECORDED TEXT INDEPENDENT UTTERANCES TO DERIVE VOICEPRINT SAMPLES — 206

FIG. 13

- CONNECT CALL TO OPERATOR — 302
- CONFERENCE CALL TO VOICE GATEWAY — 304
- COLLECT VOICEPRINT SAMPLES — 306
- ANALYZE AND PROCESS NEW VOICEPRINT SAMPLES — 308

FIG. 14a

- DETERMINE PHONE TYPE USED TO MAKE CALL — 402
- SET VOICEPRINT COMPARISON THRESHOLD BASED ON PHONE TYPE — 404
- RECEIVE VOICEPRINT OF CALLER — 406
- COMPARE RECEIVED VOICEPRINT TO VOICEPRINT SAMPLE TO YIELD A CONFIDENCE SCORE — 408
- APPLY CONFIDENCE SCORE TO SET THRESHOLD — 410

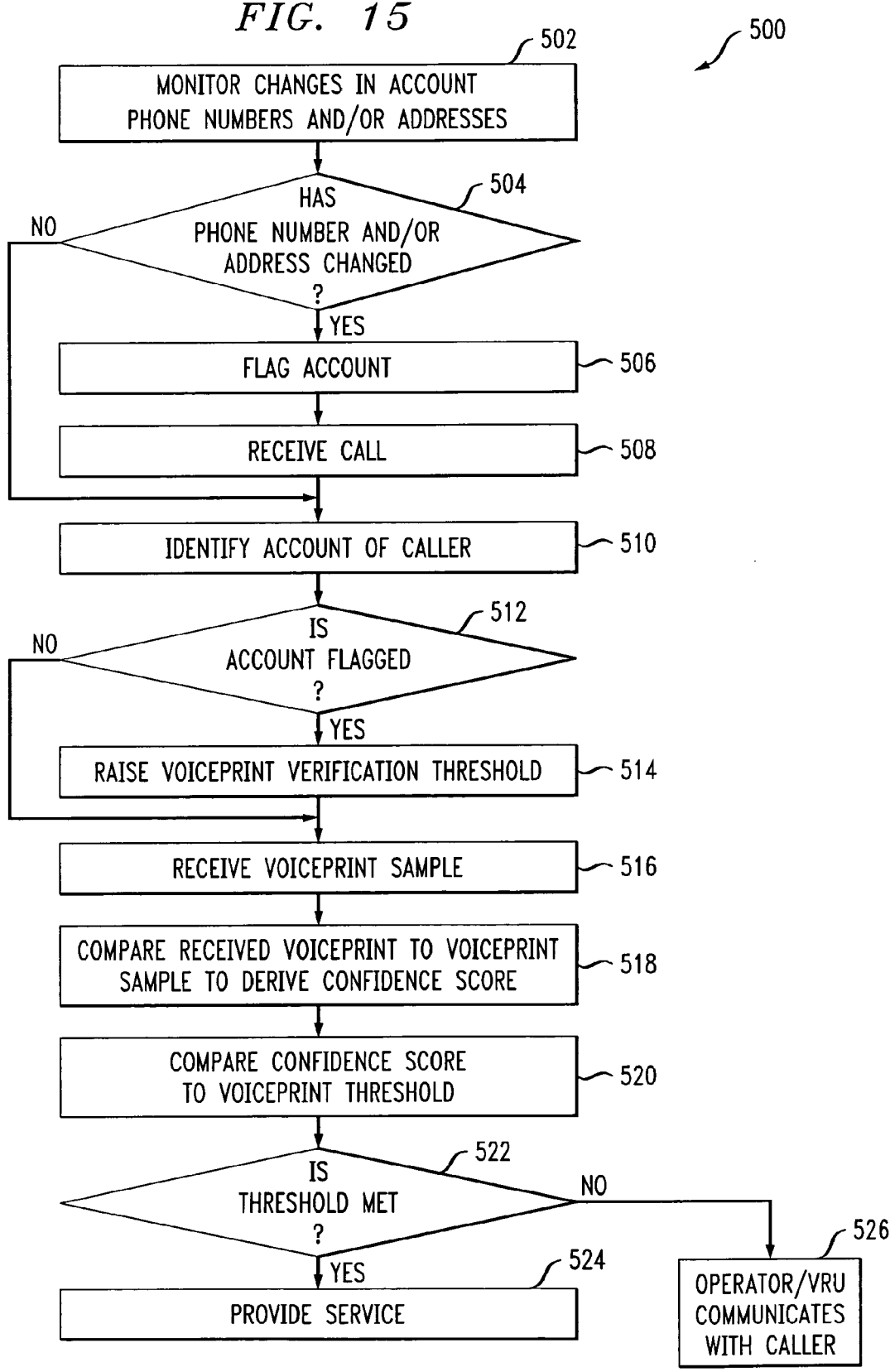

TECHNIQUE FOR CONTINUALLY ASSISTING A USER DURING AN INFORMATION ASSISTANCE CALL

This application is a continuation application of U.S. patent application Ser. No. 12/979,331 filed on Dec. 28, 2010, which in turn is a continuation of U.S. patent application Ser. No. 11/115,940, filed on Apr. 27, 2005, the entirety of which are incorporated by reference.

FIELD OF THE INVENTION

The invention relates to a communications system and method and, more particularly, to a system and method for providing an information assistance service with enhanced service features.

BACKGROUND OF THE INVENTION

It is a common experience to use a wireline or wireless telephone to call an operator for information assistance. In a typical information assistance call, a caller identifies to the operator the name and address (sometimes city or area code) of a party whose telephone number is desired. In response, the operator locates the desired destination number using a computer database, for example. The destination number is then provided to the caller. The number may be provided by a voice server which provides automated voicing of the number. The caller may be afforded an option to be connected to the destination number without the need of first terminating the information assistance call.

Further, as disclosed, e.g., in U.S. Pat. No. 5,797,092 issued Aug. 18, 1998 to Cox et al., the caller can take advantage of a StarBack® service feature to be reconnected to an operator during an information assistance call. For example, after the caller communicates with the party at the destination number, the caller may press a predetermined key, e.g., a "*" key, on the telephone keypad to return to an operator for further assistance, e.g., to obtain another destination number.

SUMMARY OF THE INVENTION

The invention is premised upon the recognition that an information assistance service is a conduit to an immense source of information. For example, through the help of an information assistance provider (e.g., an operator and/or a voice server), a user may access not only traditional white page and yellow page directory information, but also restaurant, shopping and entertainment guides; event, traffic, weather and flight information, etc. The invention is also premised upon the recognition that the aforementioned StarBack® service feature enables an information assistance caller to search the immense source of information efficiently. For example, an information assistance caller who is looking for a movie theater showing a desired movie may be connected by the information assistance service to one such theater to purchase tickets for the movie. In the event that the caller finds out that the theater has sold out the tickets for the movie, the user may conveniently press a "*" key to return to an information assistance provider to obtain information about a second theater showing the same movie, and to be connected to the second theater, and so on and so forth. Thus, such an information assistance process may be iterative in that a user may need to repeatedly return to an information assistance provider to accomplish the task at hand.

In prior art, during an information assistance call, the caller most likely returns to an information assistance provider which is "memoryless." For example, the caller most likely returns to an operator who did not help the caller in the information assistance call in question. Even if the operator did help the caller, the operator may not be able to remember the details of the caller's inquiry because of the intervening information assistance calls which the operator has answered. Unfortunately, in either case, the user has to repeat the details of his/her inquiry, and additionally informs the current operator of the past unsuccessful attempts, e.g., to purchase the movie tickets from certain theaters, so that the operator would be able to search for new information, e.g., about a different movie theater. This proves to be cumbersome and frustrating to the caller, more so as the iterative process continues.

A solution to the above-identified problem is have each operator write notes about the caller's inquiry in each interaction, to which a later operator may refer to further assist the caller. However, this may prove to be ineffective in that the notes writing takes time away from an operator which otherwise can be used to answer additional calls. More importantly, the quality of the written notes can hardly be controlled and varies from one operator to another. As a result, the notes written by one operator may be erroneously interpreted by another.

The invention overcomes the prior art limitations by automatically retaining certain search results in each iteration, e.g., each destination number located. In accordance with an embodiment of the invention, when the caller is reconnected to an information assistance provider, a reverse search is performed on the destination numbers retained during the same call. The reverse search results may comprise, e.g., the name and address of each entity the user has contacted, the business type of the entity, etc. This provides much intelligence about what the caller is looking for. Continuing the example above, if all of the previous destination numbers are associated with movie theaters in a particular area, the information assistance provider may simply ask what movie the user is interested to see, and proceeds to search for another movie theater different from the previous ones in the same area.

Thus, in accordance with the invention, when a call is received from a user, which includes an information assistance request, a search is conducted on a database in response to the request. The search result, e.g., a destination number, is stored in association with the call. The user is connected to a communications device associated with a desired party, and may be reconnected to an information assistance provider for further assistance during the call. In that case, the previous search result is retrieved, and an analysis of the search result, e.g., a reverse search on the destination number, is performed. The user is then further assisted based on such an analysis. The further assistance may involve a second search. The result of the second search is also stored in association with the call in anticipation of the user returning to a second information assistance provider during the call.

BRIEF DESCRIPTION OF THE DRAWINGS

Further objects, features and advantages of the invention will become apparent from the following detailed description taken in conjunction with the accompanying drawing showing an illustrative embodiment of the invention, in which:

FIG. 10 illustrates a user profile record accessible through the profile gateway of FIG. 3;

FIG. 12 is a flowchart depicting a process for obtaining a voiceprint sample in accordance with one embodiment of the invention;

FIG. 13 is a flowchart depicting a process for obtaining additional verbal utterances for use in deriving a voiceprint sample in accordance with another embodiment of the invention;

FIG. 14a is a flowchart depicting a process for adjusting a threshold for use in verifying a voiceprint in accordance with one embodiment of the invention;

FIG. 15 is a flowchart depicting a process for adjusting a threshold in accordance with another embodiment of the invention, when there is reason to believe that a subscriber's phone number may have changed;

DETAILED DESCRIPTION

Figure 1:
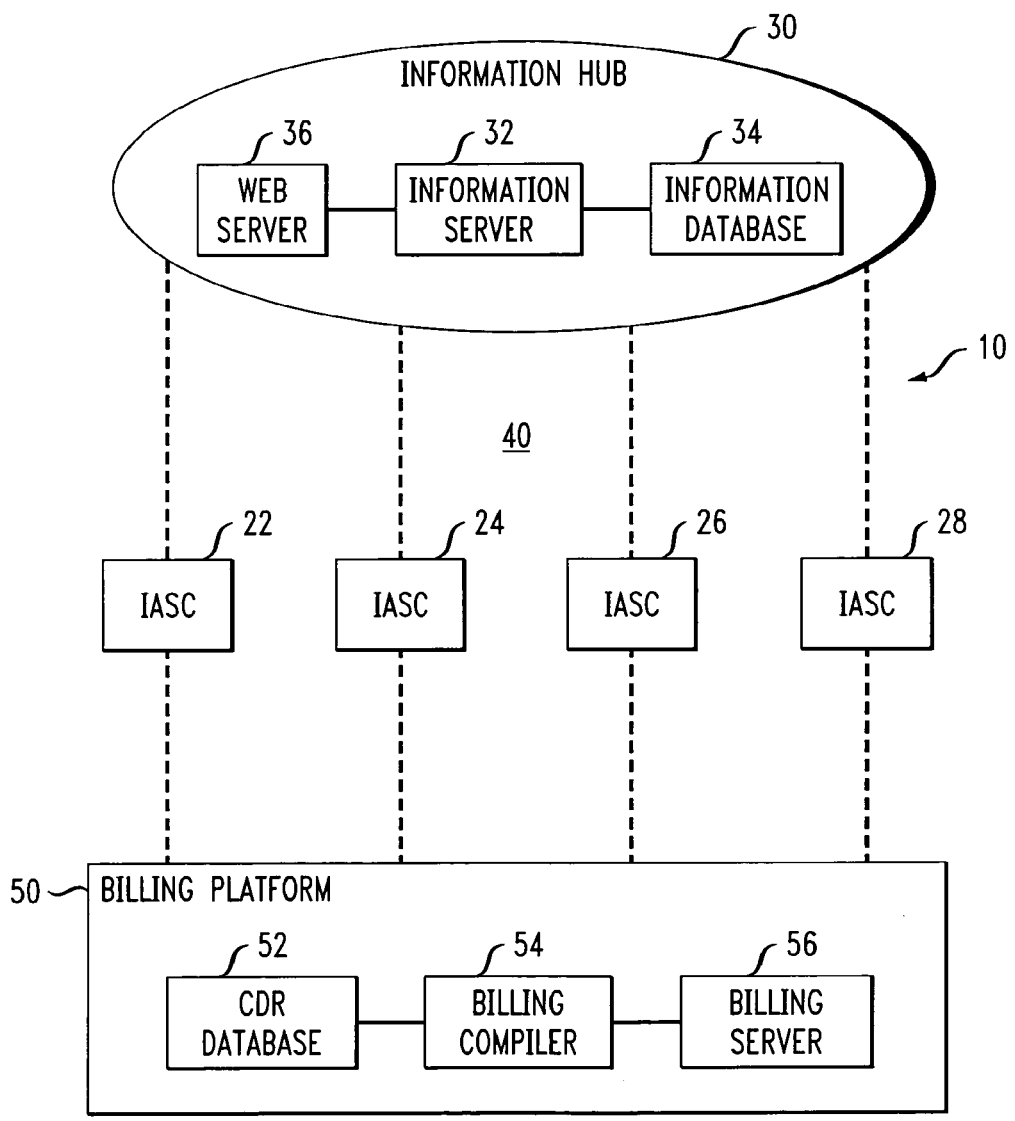
FIG. 1 illustrates a communications system, including information assistance service centers (IASCs), in accordance with one embodiment of the invention.

The invention is directed to an information assistance service for assisting a user to search for relevant information and to accomplish a task at hand in an effective manner. Through an information assistance service, a user has access to an immense source of information. For example, through the help of an information assistance provider (e.g., an operator and/or a voice server), a user may access not only traditional white page and yellow page directory information, but also restaurant, shopping and entertainment guides; event, traffic, weather and flight information, etc. In addition, the prior art StarBack® service feature enables a user to obtain relevant information and make necessary arrangements all within an information assistance call, in which the user may repeatedly return to an information assistance provider by pressing a "*" key on the telephone keypad. That is, with the StarBack® service feature, a user may repeatedly return to an information assistance provider during the same information assistance call to accomplish the task at hand.

Based on the recognition that an information assistance process may be iterative, the invention has been conceived to facilitate effective interactions between a user and information assistance providers throughout this iterative process. In accordance with the invention, during an information assistance call, certain information resulting from a search in prior iterations is retained for the benefit of the information assistance provider interacting with the user in a future iteration. In an illustrative embodiment, the destination telephone number located by the information assistance service in each iteration is retained during an information assistance call. By performing a reverse search on the retained destination telephone number(s), the information assistance provider in the current iteration can effectively help the user to search for new information to accomplish the task at hand.

For example, a user who wants to see a particular movie calls the information assistance service to look for a movie theater showing the movie. After obtaining from the caller the title of the desired movie, and the preferred location of the movie theater, the information assistance service searches for the destination telephone number of a movie theater satisfying the caller's criteria. The caller may then be connected by the information assistance service to one such theater to reserve tickets for the movie. In the event that the caller finds out that the theater has sold out the movie tickets, the caller may conveniently press a "*" key to return to an information assistance provider to obtain information about a second theater showing the same movie, and to be connected to the second theater. In this embodiment of the invention, when the caller is returned to an information assistance provider, a reverse search is performed on the retained destination telephone number of the first theater. The reverse search provides, e.g., the name and address of the previous movie theater. Such reverse search provides much intelligence about what the caller is looking for, e.g., a movie theater in a certain area. Given such intelligence, the information assistance provider in the current iteration may simply ask what movie the caller wants to see, and proceeds to search for a second movie theater different from the previous theater in the same, area showing the desired movie. Thus, advantageously, with the invention, the user's information assistance call is to some extent personalized even though the user may be served by different information assistance providers during the same call. More importantly, the information assistance service in accordance with invention is cost-effective in that the user can accomplish his/her task efficiently without the need to repeat all the call details to each information assistance provider during the call, while the information needs to be retained by the information assistance service to realize the invention, e.g., destination telephone numbers, is minimal.

To further assist the caller, supplemental information, e.g., advertising information, may be provided to the caller based on the context of the caller's inquiry. Such a context based information assistance technique is described, e.g., in copending, commonly assigned U.S. application Ser. No. 10/856,406, filed on May 27, 2004, incorporated herein by reference. Context information may be derived from information exchanges in an information assistance call. Such context information, which may not be explicit from the information exchanges, can be used to select just-in-time advertisements for the caller, which may be pertinent to an anticipated event, location, etc. of the caller, thereby increasing the effectiveness of assisting the caller. Advantageously, the derivation of the context information is transparent to the caller, which is performed as a background process without knowledge of the user.

Thus, continuing the above example, when the information assistance call is received in which a caller inquires about a movie listing, the context of the call is identified (i.e., movie event context). Based on the context of the call, the information assistance service may infer that the user will be in a movie theater showing the movie. The particular movie theater may be ascertained based on a reverse search on the telephone number of the last theater to which the caller was connected. As such, a first type of advertisement concerning the theater's facilities including, e.g., a coupon code for a discount on snacks and beverages at the theater's refreshment concession, may be provided to the caller at the conclusion of the information assistance call. Further, the service may infer that the caller must like the particular movie for which the caller purchases the tickets. As such, a second type of advertisement concerning merchandises relating to the movie, e.g., T-shirts promoting the movie, music CDs containing a soundtrack of the movie, DVDs of a past release or previews of a future release of any sequels or prequels of the movie or related movies, etc. may be provided to the caller. Moreover, the service may infer from the genre of the particular movie, e.g., comedy, that the user would enjoy a similar type of entertainment. As such, a third type of advertisement concerning, e.g., other comedic shows, plays, movies, literature, books, etc. may be provided to the caller. In addition, the service may infer that the user would be in the vicinity of the identified movie theater some time before and after the movie. As such, a fourth type of advertisement concerning, e.g., a restaurant, bar, dining facility, nightclubs, etc. in the vicinity of the movie theater may be provided to the user. Further, with the aid of a user profile maintained by the service for the user, the specific advertisements may be more targeted to the user. For example, with the knowledge from the user profile that the user prefers a particular cuisine, the fourth type of advertisement may be narrowly directed to restaurants serving his/her preferred cuisine in the vicinity of the movie theater.

It should be noted that the aforementioned types of advertisement are for illustrative purposes only. It will be appreciated that the actual advertisements provided to a user will vary from call-context to call-context. For example, during an information assistance call in which a user requests an information assistance provider to help make a hotel reservation, the call context is identified (i.e., hotel reservation). Context information is then derived, which may not be explicit from the information exchanges in the call. For instance, based on the name of the hotel desired by the user, the system, without the user's knowledge, may search a hotel listing database for the rating of the hotel, e.g., a 5-star rating. The service may infer from the 5-star rating of the hotel that the user enjoys a luxurious lifestyle. As such, advertisements concerning luxury car rentals, fine dining facilities (e.g., 5-star rated), etc. in the same city as the hotel, which comport with the user's lifestyle, may be provided to the user.

It should also be noted that multiple users, e.g., family members, may share the same account with the information assistance service, which may be identified, e.g., by the home telephone number. The access of a user profile of an individual member involves proper identification of the member calling the information assistance service. In practice, a family member calling the information assistance service from the home telephone number is identified based, e.g., on an automatic number identification (ANI) determining the originating telephone number and, thus, the information assistance service account, followed by a voiceprint, PIN, etc., determining the individual family member personally. Once the particular family member is identified, the information assistance service may provide targeted advertisements to the individual based on his/her user profile and other information pertaining to the individual.

FIG. 1 illustrates an example of a communications system 10 embodying the principles of the present invention. In this example, the communications system 10 is an information assistance service system. The information assistance service system 10 includes a plurality of operators dispersed throughout a wide coverage area in information assistance service centers (IASCs) 22 through 28. IASCs 22 through 28 are coupled to each other and to one or more information hubs 30 through a network 40. The network may be a wide area network (WAN) 40 covering an extensive area, for example. WAN 40 can be an Internet-based network, such as the World Wide Web, or a private intranet based network. Each of IASCs 22 through 28 may cover one or more regional coverage areas. Information assistance service system 10 may be accessed directly by a user on a wireline phone, wireless phone, and other such communications devices through which a customer may communicate with system 10 by voice.

Information hub 30 may include one or more processors, such as information server 32, which is accessible by the operators in the system 10, and one or more memory devices, such as information database 34, in which identifying information about each user is stored and maintained. Each subscriber account may include one or more individual users. For example, a single account established by a subscriber (e.g., a parent) may include multiple members of a family as users (e.g., children). Similarly, a single account established by a business subscriber may include multiple employees of the business as users.

A folder may be associated with one or more communications identifications of the respective subscriber's communications devices that the subscriber has registered with system 10. For example, the communications identification may be a phone number of a subscriber's wireline or wireless phone. The presence or absence of a subscriber folder corresponding to a phone number or other such identifying data may be used to indicate whether a caller is an authorized user of the system or not.

The subscriber folder may include user profiles of the subscriber and other users of the subscriber account. Each user profile may, contain preferences of the user associated therewith, as described in co-pending, commonly assigned application Ser. No. 10/323,287, filed on Dec. 19, 2002 ("the '287 application"), incorporated herein by reference. A user may specify in a user profile his/her preferred types of events, areas of interest, food, goods, services, manufacturers, merchants and other personal preferences, e.g., preferred music, fashion, sports, restaurants, seating on a plane, frequent flyer number, frequent stay number, sizes of jackets, etc. Such a profile may be used by a server to tailor the content of information delivered automatically to the user as soon as the information becomes available. The user may also specify in the profile the preferred method of handling his/her information assistance call, e.g., use of a special skilled operator, such as a Spanish speaking operator, to answer such a call. Thus, by using a user profile, the user is automatically provided with an individualized service, without the need of otherwise repeating the preferences each time when calling an operator to obtain information and assistance. The user profiles in the subscriber folder may contain a voiceprint sample of the users associated with the account, respectively. The voiceprint sample may be compared to a voiceprint received from a caller to verify the identity of the caller, enabling greater personalization of services based on the caller's user profile, as described further below.

The personal preferences in a user profile may be specified by a user during registration with system 10 via a phone call, for example, in response to registration questions posed by an operator or a voice response unit (VRU). Personal preferences may also be entered and changed via a web page. A subscriber will typically also register the phone number of each phone that may be used to call system 10, and identify the type of phone as a wireline or wireless phone. A phone that is used as a speakerphone may also be identified as such.

One or more voiceprints may be obtained during the registration process and subsequent calls between a user and system 10 to derive a voiceprint sample, in accordance with certain embodiments of the invention, as discussed further below. If there are multiple users to an account, each user may provide a voiceprint during registration by speaking on the phone in turn, or at a later date.

Subscriber folders and other such information may also be stored locally at one or more of the IASCs 22 through 2B, as described in the '287 application. Local storage may speed access to the information by a respective IASC 22 through 28. The folders and information at different IASCs may be synchronized. Synchronized databases provide necessary backup as well as support to roaming mobile device users.

Web server 36 may also be provided in information hub 30, coupled to information server 32 and/or other servers. Subscriber account information, such as billing information, may be stored in web server 36. The system's website may also be provided by web server 36 or by another server connected to the Internet. Web server 36 may be coupled to system 10 at other locations, as well.

IASCs 22 through 28 may also be coupled to billing platform 50 via WAN 40 or other such network. Billing platform 50 generates billing records, which may be bills or precursors to bills, from event records, such as call detail records (CDRs), generated by IASCs 22 through 28 to document the events occurring during a call. An event may be any activity at the call center related to handling of the call. Each event during the course of a call may cause generation of a CDR by a component of the call center involved in that event. For example, upon receipt of a directory assistance call at one of the IASCs 22 through 28, a servicing switch there may generate a CDR. Other examples of events that may cause generation of a CDR include queuing a call while waiting for an operator to become available, connecting the call to an available operator, conducting a search of a database for directory assistance or other services, activating a voice response unit (VRU), connection to a destination number, etc. The generation of CDRs for such events is described in copending, commonly assigned U.S. application Ser. No. 09/777,061, filed on Feb. 5, 2001, which is incorporated by reference herein. Billing platform 50 may be part of information assistance service system 10 or part of a network carrier. It may also be a third party contracted to compile information for bills, contracted by system 10.

The CDR(s) generated during a communication contain the communication related information necessary to compute a bill for the communication, such as call duration, toll connection, information assistance service, and the type and/or class of information service provided, to the extent that charges vary depending upon the type of information service provided. CDRs are sent to billing platform 50, which compiles the CDRs for each call and for calls for each customer.

Billing platform 50 may comprise call detail record (CDR) database 52, billing compiler 54 and billing server 56. CDR database 52 collects and stores CDRs generated by IASCs 22 through 28. Billing compiler 54 is a processor or computer that compiles CDRs related to the same call and to the same customer. CDRs related to the same call may be identified by a common identification number assigned to each CDR by an IASC 22 through 28 handling a particular communication, as described below. CDRs related to the same subscriber may be identified by the ANI of the phone registered with the subscriber's account, for example, and incorporated in the CDR. A customer may have multiple phones with respective ANIs and/or other communications identifications registered with the account. Each ANI may cause generation of a separate bill or the charges for each phone may be compiled into a single bill. While a single CDR database 32, billing compiler 34 and CDR server 36 are shown, it is understood that multiple databases, compilers and servers may be used.

Billing server 56 computes appropriate charges for each call based on stored rate information and the compiled CDRs, and generates a billing record. The billing record may be a customer bill, or a precursor to a customer's bill. If billing platform 50 is part of a third party, a precursor to a bill is typically generated by billing server 56. The precursor may be provided to information service system 10, such as to web server 36, for final formatting and presentation to a customer, by mail, e-mail or through the website. An electronic bill may be generated instead of or along with the printed bill, for being e-mailed or otherwise sent electronically to the customer. Billing server 56 may also format and generate a bill and convey it to a customer by any of the methods described above. Billing server 56 also stores the generated bills and the underlying CDRs in appropriate memory (not shown) for later reference.

While information assistance service system 10 in this example includes a plurality of IASCs 22 through 28, the invention may be implemented in a system including a single IASC coupled to an information hub.

Figure 2:
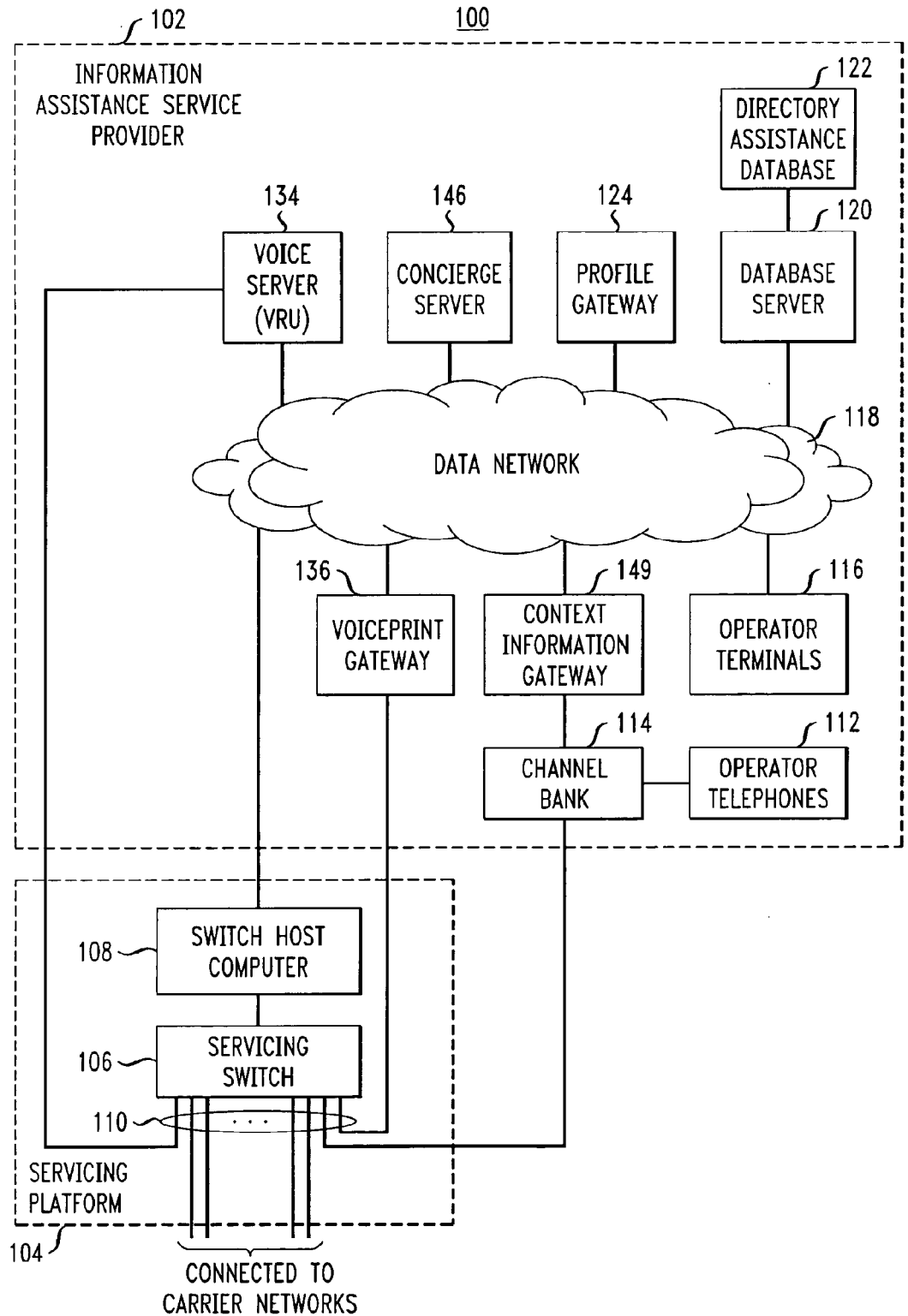
FIG. 2 illustrates an IASC of FIG. 1, in more detail.

FIG. 2 illustrates an example of an IASC 100, which generically represents one of aforementioned IASCs 22 through 28, in more detail. IASC 100 comprises information assistance service provider (IASP) 102 and servicing platform 104. Servicing platform 104 may be part of IASP 102 or separate from it. Servicing platform 104 may be located in the same geographic area or in a different geographic area than the associated IASP 102.

Servicing platform 104 includes an interface, such as a servicing switch 106, and a switch host computer 108. Switch 106 is a conventional switch connected via one or more external T1 links 110, including digital T1 links, to one or more carrier networks (not shown). T1 links 110 may be voice, data or video connections through which incoming and outgoing voice, data, and/or video communications can be made. Outgoing communications may be placed over the same or different carrier networks than the carrier network on which the incoming communication was received. Switch 106 includes digital signal processing (DSP) circuitry. Thus, switch 106 can be programmed and reprogrammed to function as, among other things, call progress analyzers (CPAs), call progress generators (CPGs), multi-frequency (MF) tone generators/detectors, dual-tone multi-frequency (DTMF) generators/detectors, and/or conferencing units, depending upon the demand placed on IASP 102 and switch 106 for each corresponding function.

Figure 19:
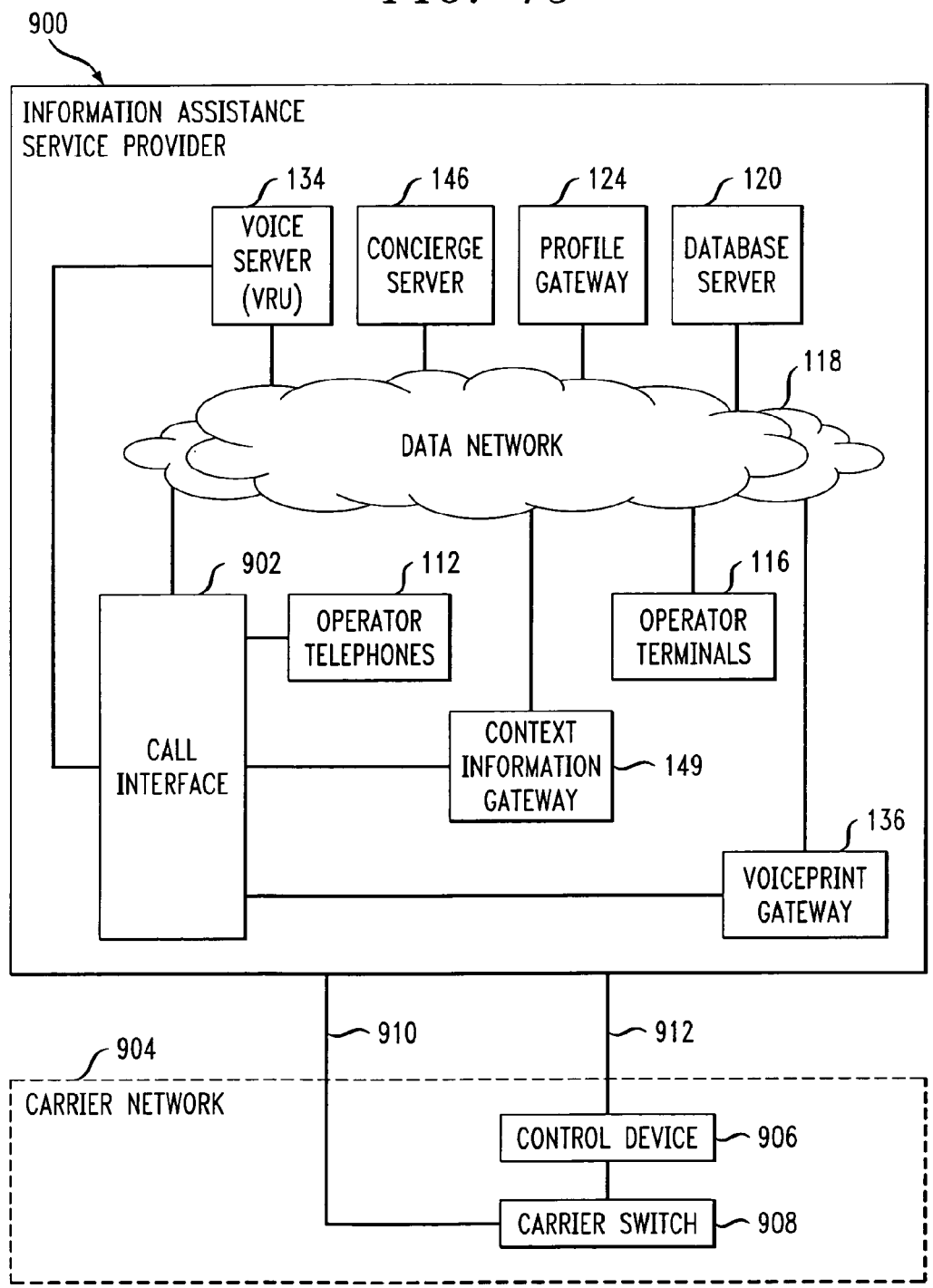
FIG. 19 is an example of an alternative information assistance service provider for use in the system of FIG. 1.

Switch host computer 108 may be programmed to control the operation of servicing switch 106, as well as the operation of the other components of IASP 102 described below. Servicing switch 106 may also be programmed to control some or all operations of the switch, instead of or in addition to the control provided by switch host computer 108. Switch host computer 108 and servicing switch 106 may each be private branch exchange (PBX) components. In FIG. 19, in contrast, IASP 900 is shown without a PBX switch and host computer.

The one or more operators in IASP 102 are equipped with operator telephones 112, which are coupled to servicing switch 106 via channel bank 114 and a T1 link 110. The one or more operators are also equipped with respective terminals 116. Each terminal 116 includes a video display unit and a keyboard with associated dialing pad (not shown). Operator terminals 116 are connected over data network 118 to one or more database servers 120 (although only one is shown here). The database server 120 is coupled to one or more directory assistance databases 122.

Operators at operator terminals 116 may access database server 110 to obtain requested information, such as a user's desired party and the appropriate destination telephone number of the party, by conducting searches for the requested information. Other information assistance or specialized communications services, such as restaurant recommendations, movie listings, events, special offers, etc., may also be provided by searching database server 110.

Data network 118 includes a local area network (LAN) supplemented by a number of point-to-point data links, for example. Through data network 118 and routers (not shown), components of IASP 102 may also be connected to the Internet.

Figure 3:
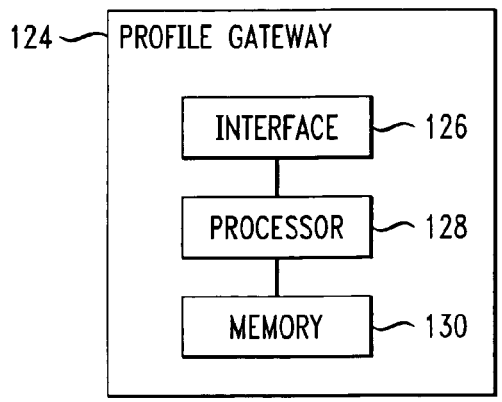
FIG. 3 is an example of a profile gateway in FIG. 2, in more detail.

IASP 102 also includes profile gateway 124 coupled to data network 118. Profile gateway 124 contacts information hub 30 to request information about a user, such as a user profile. Profile gateway 124 may comprise interface 126, processor 128 and memory 130, as shown in FIG. 3. Memory 130 here generically includes disks, caches and volatile and non-volatile memory.

Voice server 134, which may be a voice response unit (VRU), for example, is used to play the constantly repeated parts of an operator's speech, such as, the various greetings and signoffs (or closings). Voice server 134 may also have voice recognition capability, to interpret verbal statements made by a customer. For example, instead of connecting a call to an operator, switch host computer 108 may connect the call to voice server 134, which may request that the customer recite the name of a party for example customer desires directory assistance, as described further below. Voice server 134 is connected via data network 108 to switch host computer 108 and via one or more T1 spans to switch 106. Voice server 134 may comprise a general purpose computer and one or more voice cards for voice recognition, voice recording and playback, and call progress analysis, for example. If more than one voice server is provided, each one is connected to servicing switch 106 by a separate T1 link.

At appropriate stages in a call progression, switch host computer 108 initiates a voice path connection between voice server 134 and switch 106 so that the caller, or the caller and the operator, are able to hear whatever pre-recorded speech is played on that connection by voice server 134. Switch host computer 108 then instructs voice server 134, via data network 118, what type of message to play, and passes data parameters that enable voice server 134 to locate the message appropriate to the call.

Figure 4:
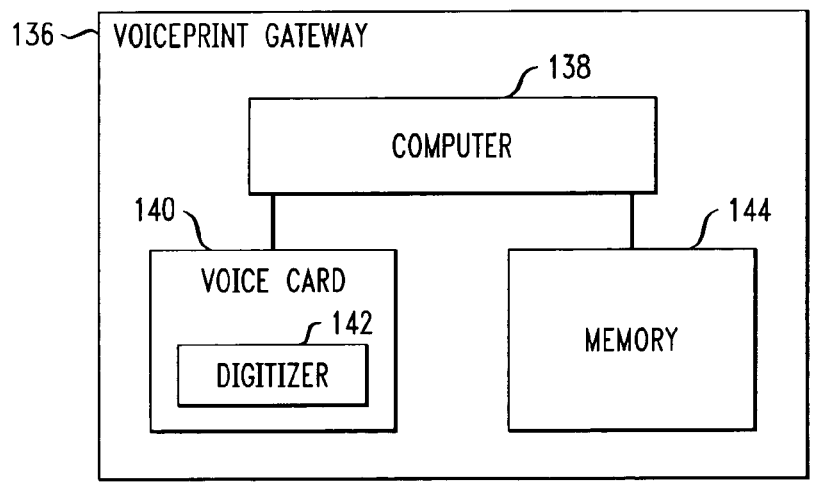
FIG. 4 is an example of a voiceprint gateway in FIG. 2, in more detail.

Voiceprint gateway 136 is provided to receive, record and digitize a voiceprint received from a caller. Voiceprints for use in developing a voiceprint sample or model for comparison to later received voiceprints, are also received and processed initially by voiceprint gateway 136. Processing of voiceprints into voiceprint samples is discussed further, below. Voiceprint gateway 136 may be structurally similar to voice server 134 and their functions may be combined. Voice server 134 may be coupled to servicing switch 106 through voiceprint gateway 136, instead of being directly connected to it, as shown in FIG. 2. Voiceprint gateway 136 may play instructions to a caller, as well, such as asking the caller to repeat a passphrase/password, for example, so that a voiceprint may be collected. As shown in FIG. 4, voiceprint gateway 136 may comprise computer 138, such as a general purpose computer. One or more voice cards 140 and memory 144 are coupled to computer 138. Voice card 140 may include digitizer 142. As above, memory 144 generically includes disks, caches and volatile and non-volatile memory. Voiceprint gateway 136 is coupled to servicing switch 106 via one or more T1 links 110 and to data network 118. Voiceprint gateway 136 may be a LINUX server running suitable voice recognition or speaker identification software. For example, the voiceprint gateway 136 may run SpeechSecure™, available from SpeechWorks International, Inc., Boston Mass. Exemplary patents related to speech verification include U.S. Pat. No. 6,519,561, U.S. Pat. No. 6,480,825, U.S. Pat. No. 6,038,528, U.S. Pat. No. 5,862,519, U.S. Pat. No. 5,839,103, U.S. Pat. No. 5,634,087, and U.S. Pat. No. 5,634,087, which are incorporated by reference herein. Suitable software may also be obtained from Nuance Communications, Inc., Menlo Park, Calif., for example.

To access IASC 100 of information assistance service system 10, customers of a particular telephone carrier or company may dial, speak or otherwise communicate the access digits, access codes or retail numbers established for information assistance by that carrier to access information assistance service system 10. For example, the predetermined access digits may be "411," "*555," "555-1212," "1-800-555-1212," "00," or other designated access numbers. Upon receiving such access digits from a customer's communications device, the participating telephone carrier's switching system routes the call to an IASC 100 of information assistance service system 10 (via a T1 link 110), where it appears as an incoming call. Customers and other users of information assistance service system 10 may also call the system directly, in which case the call is also received by servicing switch 106 along one of the T1 links 110.

To connect a call to an IASC 100, a carrier network switch (not shown) of a participating carrier sends call setup signals containing data concerning the call, such as an ANI identifying the originating wireline or wireless phone, a dialed number identification service (DNIS) string identifying the dialed telephone number or other such communications number, the area of the call's originating site, and/or a customer identification number assigned by the carrier, to servicing switch 106. The received call setup signals are monitored and processed by switch host computer 108, which assigns a call sequence number to the call, to uniquely identify the call within the information assistance system 100. A CDR is created for each call by switch 106, based on this information.

System 10 uses several criteria to identify a caller as an authorized user to the system before providing service to the user. Preferably, at least two criteria must be met to verify the identity of a caller as an authorized user. In one example, the first criterion is a phone number or other such identifier of a phone registered with system 10. An identifier in the call setup signals, such as the ANI, identifying the originating phone number, is examined and if the phone is registered with an account with the system, the phone and the associated account is identified. The DNIS may also be used under certain circumstances, as discussed above. A caller may also inform an operator of system 10 of a phone number of a registered phone, verbally. For example, if a caller is not calling from a registered phone, an operator or voice server 134 may request that the caller provide a number of a registered phone. The caller is thereby preliminarily identified as a particular authorized user (if there is only one user associated with the account), or as one of a limited number of authorized users associated with the account.

In this example, the second criterion is the voiceprint of the caller. To verify that the caller is the preliminarily identified user or to identify the caller as a particular one of several authorized users, a voiceprint of the caller is compared with a stored voiceprint sample or samples of authorized users of the account to determine if there is an acceptable match.

In this example, if a voiceprint sample is not available or if voiceprint analysis is not conclusive, a third criterion may be other identifying information, such as a PIN, the user's mother's maiden name, etc. Preferably, either the first and second or the first and third criteria are used to verify identity. It is preferred not to use the second and third criteria together to verify identity. This verification process will now be described in more detail.

To preliminarily identify the caller as an authorized user, switch host computer 108 may extract the ANI from the call setup signals and transmit the ANI to components of IASC 100, including profile gateway 124, through data network 118. Interface 126 of profile gateway 124 may receive the ANI and convey the ANI to processor 128. Processor 128 then requests information server 32 of information hub 30 (see FIG. 1) for a subscriber folder associated with the ANI or other such identifier in the call set up signals, via WAN 40. Information server 32 then searches information database 20 for such a subscriber folder. If a folder is found, it is sent to profile gateway 124, via WAN 40. The folder may be stored in memory 130.

If there is only one user, i.e., the subscriber, associated with the subscriber folder (and thus the subscriber account), then system 10 preliminarily identifies the caller as that subscriber. If there are multiple users associated with the folder (account), then system 10 has preliminarily identified the caller as one of those multiple users.

The call may be directed to an operator device, such as operator telephone 112 and operator terminal 116 of an available operator, by switch 106 under the control of switch host computer 108. Information in the subscriber folder including user profile(s) is made available to an operator from profile gateway 124 via their respective terminal 116.

Automatic call distribution (ACD) logic, which may reside in switch host computer 108 or elsewhere in system 100, may be used to queue (if necessary) and distribute calls to available operators at operator devices in the order in which they are received, to evenly distribute the call traffic among the operators. Other distribution logic schemes may be used instead, such as skills-based routing or a priority scheme for preferred callers.

To confirm the identity of the caller as the preliminarily identified subscriber, or to identify the caller as one of the multiple users of the account, the voiceprint gateway 136, voice server 124 or the operator may ask the subscriber to state their passphrase or password to obtain a voiceprint of the caller. Voiceprint gateway 136, which may be conferenced into the call, receives and digitizes the passphrase or password to form the voiceprint. The voiceprint is encapsulated within a Voice Extensible Markup Language (Voice XML) file and sent to information server 32 with instructions to compare the voiceprint to the voiceprint sample or model stored in (or associated with) the subscriber folder in information database 34 identified through the ANI (and already provided to profile gateway 124). The digitized voiceprint is compared to the voiceprint sample to yield a statistical measure of the correspondence between the two. The measure may be a confidence score, for example, indicative of the degree of correspondence between the received voiceprint and the stored voiceprint sample. The confidence score may be compared to a threshold to determine if the degree of correspondence is sufficient to conclude that the voiceprint and the voiceprint sample are from the same party, with an acceptable degree of certainty. If a score is below the threshold, the identity of the caller as a particular user is not confirmed. The operator may then ask the caller for other information to confirm their identity, such as a PIN, name, address, mother's maiden name, etc. Voiceprint gateway 136 or voice server 134 may also compare the voiceprint to the voiceprint sample and compare the resulting confidence score to the threshold.

An upper and a lower threshold may be provided defining three ranges. If the confidence score is greater than or equal to the upper threshold, the identity of the caller as a particular user is confirmed. If the confidence score is below the lower threshold, the test is failed and service will not be provided, unless the caller provides additional information to satisfy the operator that caller is who they purport to be. For example, the caller could provide a name, PIN and mother's maiden name. If the confidence score is greater than or equal to the lower threshold but less than the upper threshold, the results are ambiguous and the operator, voice server 134 or voiceprint gateway 136 may ask the caller to repeat the passphrase/password or provide other information, such as a PIN. On a scale of 0.0 through 1,000.0, the upper threshold may be 600 and the lower threshold 350, for example.

A user may fail the voiceprint test because the registered phone number of the subscriber has been assigned to another party. The subscriber may have moved, for example, and not updated system 10. Alternatively, the caller may be a subscriber using a new phone, who may not have updated system 10. The operator may then update the subscriber's account. If the caller does not have a subscription, the operator may offer to register the caller with system 10.

If there is only one user, i.e., the subscriber, to an account, then the voiceprint received from the caller need only be compared to the one voiceprint sample of that subscriber. In this case, the voiceprint verifies the identity of the subscriber, who has been preliminarily identified based on the ANI or other such identifier of the subscriber's phone.

If there are multiple users to the account, such as family members or employees of a business, there may be multiple voiceprint samples associated with the account. The received voiceprint may be compared with each voiceprint sample and the identity of the caller may be determined based on the voiceprint sample with the highest confidence score equal to or above the threshold. Multiple thresholds may be provided, as discussed above. In this way, a caller may be identified without requiring input of a PIN or other such information.

If a subscriber is calling from a public phone or another party's phone whose number is registered with system 10, the ANI of the phone will not be correlated with a subscriber account or folder. In that case, the operator, or voice server 134 or voiceprint gateway 136 may then ask for identifying information, such as the caller's name or phone number of the phone registered with the system. The caller's voiceprint may then be used to verify the identity of the caller. Further information may be requested to verify the identity of the caller, such as the user's PIN, password, mother's maiden name, etc. The voiceprint may then be used, if desired, to provide further verification that the caller is the subscriber corresponding to the PIN, etc.

If the caller is using another subscriber's phone, then the system will preliminarily identify the caller as a user to the account of that other subscriber. The voiceprint of the caller should not, however, sufficiently correspond to the voiceprint of an authorized user and the identity of the caller as an authorized user will not be verified. Again, the operator, voice server 134 or voiceprint gateway 136 will then ask the caller for the caller's name and/or phone number of a registered phone. The voiceprint and/or other identifying information may then be used to verify the identity of the caller, as discussed above.

Voiceprints work best in identifying one out of a limited number of parties. In most cases, the ANI will narrow the class of probable callers to the one or limited number of users associated with an account. The voiceprint of the caller may then be used to readily and quickly verify the identity of the one user or determine which one of a limited number of users is the caller. If there are too many users associated with the account to match a voiceprint in a reasonable amount of time, it may still be necessary for an operator or voice server 132 to intervene and request additional information. A voiceprint may be compared to up to about 25 voiceprint samples in a reasonable amount of time with acceptable accuracy for a typical information assistance service system, for example.

After verification of the identity of the user, the operator may address the user by the name found in the user profile. The user may then request information assistance, such as the phone number and/or address, of a party. The operator submits the requested party's name to database server 120 via data network 118 by clicking on a button or tab on the screen or depressing a key on the keyboard. Database server 120 conducts a search of directory assistance database 122 for the requested party.

If a phone number, address or other such communications identification corresponding to the requested party's name is found, the number may be sent to the requesting operator terminal 116 by database server 120. The retrieved number may be displayed on the operator's monitor. The customer may then be verbally informed of the number by the operator. Alternatively, the number may be provided to voice server 134 via switch host computer 108. Voice server 134 may then generate a message reciting the number.

The information assistance call may then be terminated or the customer may be given the option of being connected with the communications number (i.e. telephone number) of the requested party, as is known in the art. The option may be presented by the operator or by voice server 134. The customer may accept the option by a verbal indication to the operator or voice server 134 or by entry of data through the customer's phone. If the call is connected to the requested party, servicing switch 106 may send call setup signals for the call, including the requested party's number as a DNIS, to a carrier switch for connection to the requested party. Alternatively, system 10 may connect the call to the requested party via servicing switch 106. The information assistance call is then completed. The connection between the customer and the IASP 10 may be terminated or it may be maintained in order to provide additional information assistance via the well-known StarBack® feature.

Instead of connecting the call to an operator at an operator device, switch host computer 108 may connect the call to voice server 134 to request verbal input of a requested party's name or concierge request and/or to present other options, as is known in the art. If voice server 134 can identify the request, the name is conveyed to data server 120 via data network 118, to conduct a search, as described above. If voice server 134 cannot identify the request, the call is connected to an operator device by switch host computer 108 for handling by an operator, as described above.

As mentioned above, verbal utterances of a subscriber to system 10 may be collected during phone registration of the subscriber (or at a later time) to derive voiceprint samples. Voiceprint gateway 136 may be conferenced into the call, and request the new subscriber to repeat a passphrase or password several times, such as three times, for example. The passphrase or password is recorded and digitized by voiceprint gateway 136. The digitized voiceprints are encapsulated in a Voice XML file and sent to information server 32 with instructions that the voiceprints are to be processed to form voiceprint samples. Information server 32, which also runs SpeechWorks™ or other appropriate software, creates a mathematical representation of the voiceprints to form a voiceprint model or sample, and stores the voiceprint sample. Preferably, the voiceprint sample is stored in information database 34 as part of the subscriber profile in a folder for the new subscriber. Voiceprint gateway 136 or voice server 134 may process the voiceprints into voiceprint samples instead of or along with information server 32, as well.

If multiple parties are using the same subscriber account, verbal utterances of each party may be collected and processed in turn. Each party may establish his/her preferences during a registration, which are made part of the user profile associated with the party. However, the subscriber to the account may impose usage limits on himself/herself and/or other registered users of the same account. For example, the aforementioned concierge services also include the information assistance service's making reservation for or purchases of products or services on behalf of a user. The subscriber may provide method of payment information concerning, e.g., credit cards, debit cards, electronic wallets, lines of credit, etc. to which the purchases may be charged. The subscriber may also impose usage limits on purchases for different types of products or services on an account-user by account-user basis. Such usage limits may be specified by the subscriber during the initial registration and may be changed subsequently.

Concierge server 146 in FIG. 2, coupled to data network 118, is used to provide concierge services, which include, inter alia, a restaurant guide and reservation service, event information, ticketing and reservation service, hotel reservation and availability service, travel or flight reservation and ticketing services, ordering specific items such as flowers or food delivery, arranging transportation, and accessing entertainment guides. In particular, relying on server 146, an operator may provide movie listings and corresponding movie theater locations to a user through a database search.

Concierge and service inquiries, reservations transactions are handled by concierge server 146 using form templates appearing on the display of the operator's terminal 116. The information concerning providers of desired products or services, e.g., their names, addresses, business hours, URLs, contacts, etc. is also shown and formatted in fields of a graphical user interface (GUI). Similarly, the specifications, prices and schedules, etc. of desired products or services are also shown and formatted in fields of a GUI. Concierge server 146 in this instance also keeps records as to what products or services, and what product or service providers have advertisements thereof in system 10 to be "pushed" to the users under contractual, terms with advertisers. The actual advertisements may be stored in different forms (e.g., audio, text, graphics, video. etc.) in information server 32. An advertisement indicating field may be provisioned next to a product, a service, or a product or service provider located and shown on a GUI to indicate whether an advertisement is available therefor in system 10.

During an information assistance call, a user may utilize the StarBack® service feature to repeatedly return to an information assistance provider (e.g., an operator) to search for relevant information (e.g., movie theaters showing a particular movie) and to accomplish the task at hand (e.g., purchase of movie tickets). Thus, the information assistance call may comprise an iterative process. In accordance with the invention, certain search results in each iteration are automatically retained for the benefit of an operator interacting with the user in a future interaction. In an illustrative embodiment, destination telephone numbers which were located in response to the user's inquiry in previous iterations are retained. In the current iteration, a reverse search is performed on the retained destination telephone numbers, thereby providing the current operator at least with the names and addresses of the entities that the user contacted. With such intelligence, to further assist the user, the operator does not need to have the user repeat every call detail, including the identities of all the parties contacted by the user in the same call. The effectiveness of handling an information assistance call in accordance with the invention is evidenced by the following exemplary interactions between the user and different operators during the same call:

[Call Start]

Operator1: "How can I help you?"

User: "Can you tell me what movie theater on the Upper West Side, Manhattan is showing 'Ghostbusters II'?"

Operator1 [conduct a database search through concierge server 146]: "There is the Cineplex Theater."

User: "Can you connect me to the theater?"

Operator1 [conduct a search on directory assistance database 120, and locate the telephone number of the Cineplex Theater]: "Sure. Please hold on."

[To be Continued]

It should be noted at this point that each incoming information assistance call is assigned, e.g., by switch host computer 108 a call sequence number to identify the call. In particular, as fully described below, the call sequence number is used to associate different events taking place during the same call, which are recorded in CDRs for billing purposes. To that end, host computer 108 transmits the sequence number to switch 106, and other components in IASP 100 that may generate an event record associated with the call. In accordance with an embodiment of the invention, for each incoming information assistance call, a call tracking record identifiable by its call sequence number is created to collect certain results of searches (e.g., destination telephone numbers located by operators) conducted during the call.

Figure 5:
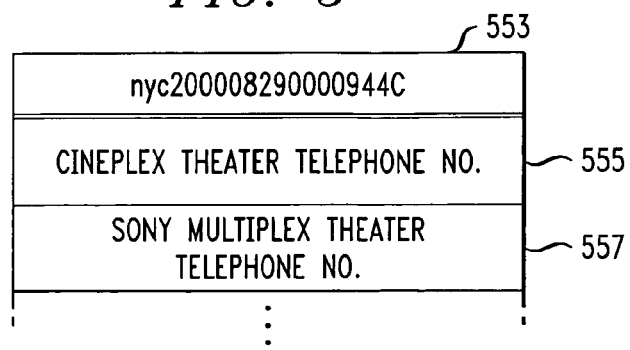
FIG. 5 illustrates a call tracking record containing destination telephone numbers for continually assisting a user during an information assistance call, in accordance with the invention.

Thus, in the above exemplary information assistance call, after the user's initial interactions with operator1, database server 120 creates a call tracking record, denoted 553 in FIG. 5, which in this instance contains in field 555 the telephone number of the Cineplex Theater located by operator1. Record 553 in this instance also contains the call sequence number "nyc200008290000944C" identifying the information assistance call in question. Call tracking record 553 is stored in computer 108, and is retrievable based on the call sequence number.

It should be pointed out that as the information assistance call progresses where additional searches are called for, record 553 would grow to also include the destination telephone numbers resulting from those searches.

Figure 6:
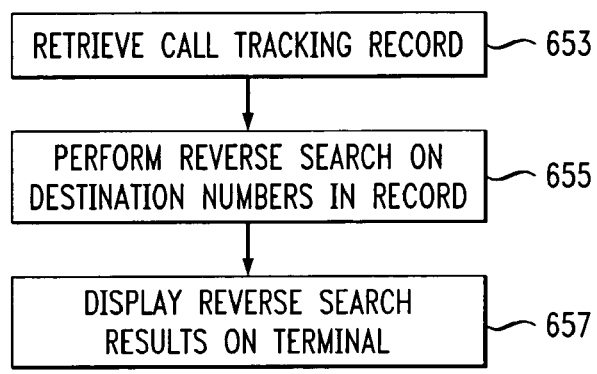
FIG. 6 is a flowchart depicting a process for assisting a user during an information assistance call based on the destination numbers in the call tracking record, in accordance with the invention.

Continuing the above example, suppose the user is connected to the telephone number of the Cineplex Theater, and finds out that the tickets for a particular show of Ghostbuster II has been sold out. The user then presses the "*" key on the telephone key pad to be reconnected to the information assistance service, in accordance with the StarBack® service feature. After detecting a DTMF signal corresponding to depression of the "*" key, switch 106 sends a request to computer 108 for transferring the call to an operator. The request includes the call sequence number identifying the call. Among other thing, computer 108 retrieves call tracking record 503 based on the received call sequence number, as indicated at step 653 in FIG. 6. Computer 108 at step 655 causes database server 120 to perform a reverse search on the destination numbers recorded in the record 503. For example, the reverse search uncovers the names and addresses of the entities associated with the destination numbers, respectively. In this instance, a reverse search on the Cineplex Theater telephone number in record 503 reveals the name of the entity, i.e., the Cineplex Theater, and its location, e.g., 1260 Broadway, Manhattan, N.Y. At step 657, computer 108 causes the reverse search results to be displayed on terminal 116 associated with the operator, e.g., operator2 to which the call is transferred. The following interactions between operator2 and the user ensues in this instance:

Operator2: [review the reverse search results displayed on terminal 116] "I can see you are planning to go to a movie tonight."

The user: "Yes, I am trying to get Ghostbusters II tickets, and so far have no luck."

Operator2: [conduct a database search through concierge server 146 to locate a theater other than the Cineplex Theater in Manhattan showing Ghostbusters II]: "You may want to try another theater. How about the Sony Multiplex Theater in Midtown."

The user: "Ok. Can you connect me to the Sony Multiplex Theater?"

Operator2 [conduct a search on directory assistance database 120, and locate the telephone number of the Sony Multiplex Theater]: "Sure. Please hold on."

At this point, database server 120 also includes the Sony Multiplex Theater telephone number in record 553, as indicated in field 557, in case the above scenario recurs. In that case, the operator, e.g., Operator3, to which the user is reconnected would be presented with the results of reverse searches on both telephone numbers of the Cineplex Theater and Sony Multiplex Theater, enabling Operator3 to further assist the user in an effective manner.

Context information gateway 149 in FIG. 2, coupled to data network 118 and channel bank 114, derives context information from vocal interactions between an information assistance provider and a user during an information assistance call. Gateway 149 may also derive context information from data interactions between an information assistance provider and concierge server 146. As mentioned before, such context information are derived using a background process, which is transparent to the user. As far as the user is concerned, the user is required to do nothing more than conducting an information assistance call in a usual manner. Based on the context information, gateway 149 identifies advertisements, pertinent to an anticipated event, location, etc. of the user, to information server 32. The latter may further filter the identified advertisements with the preferences specified in the user profile. The resulting advertisements, which are more targeted to the user, are provided to the user, e.g., at the conclusion of the information assistance call by automated voice. The advertisements may alternatively be transmitted to the user via voicemail, email, short message service (SMS), wireless application protocol (WAP), facsimile, picture phone, video phone, paging, instant messaging, text messaging, etc., which method(s) of transmission may also specified by the user in his/her user profile.

Figure 7:
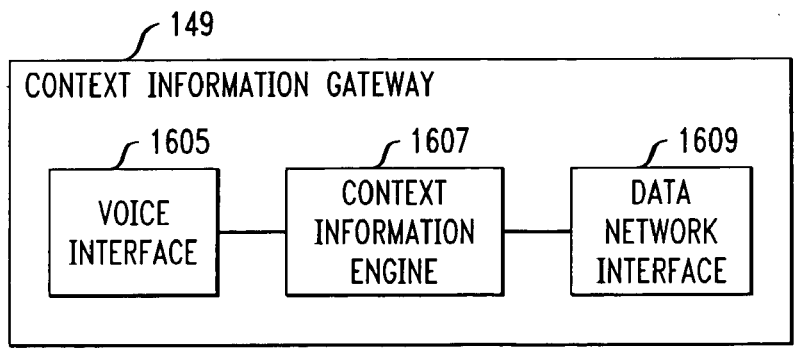
FIG. 7 is an example of a context information gateway in FIG. 2, in more detail.

FIG. 7 illustrates context information gateway 149 which comprises voice interface 1605, data network interface 1609 and context information engine 1607 which may be a conventional processor. In an illustrative embodiment, voice interface 1605 performs a well known voice-to-text conversion process on the vocal exchanges between a user and an operator during an information assistance call.

Voice interface 1605 receives the signals containing the vocal exchanges from channel bank 114, and converts the exchanges in audio form to textual form. The resulting text is analyzed by engine 1607 to derive therefrom the context information for identifying pertinent advertisements, in accordance with the invention. In addition, the data exchanges between the operator's terminal 116 and concierge server 146, e.g., searching for the theater showing "Ghostbusters II," and returning of the search results (i.e., the name and address of the theater, and show times) are pursuant to a predetermined protocol, whereby the data is exchanged, e.g., in identifiable fields in a predetermined format. Through data network interface 1609, context information engine 1607 identifies and reads the data fields communicated between the operator's terminal 116 and concierge server 146 through data network 118. Such data exchanges may also be analyzed by engine 1607 to derive therefrom context information for identifying pertinent advertisements.

However, it should be noted that the vocal exchanges between a user and an operator, as illustrated above, are free flowing and do not follow a particular format. Engine 1607 parses the textual version of the vocal exchanges to ascertain the call context and other information, which may involve keyword/keyphrase recognition, analyses of syntactical relationship between words and phrases, etc. On the other hand, the data exchanges between the operator's terminal 116 and concierge server 146 follow rigid rules. Knowing the subject of the data fields exchanged pursuant to the predetermined protocol, engine 1607 can readily ascertain the call context and other information based on the data in such data fields.

Figure 8:
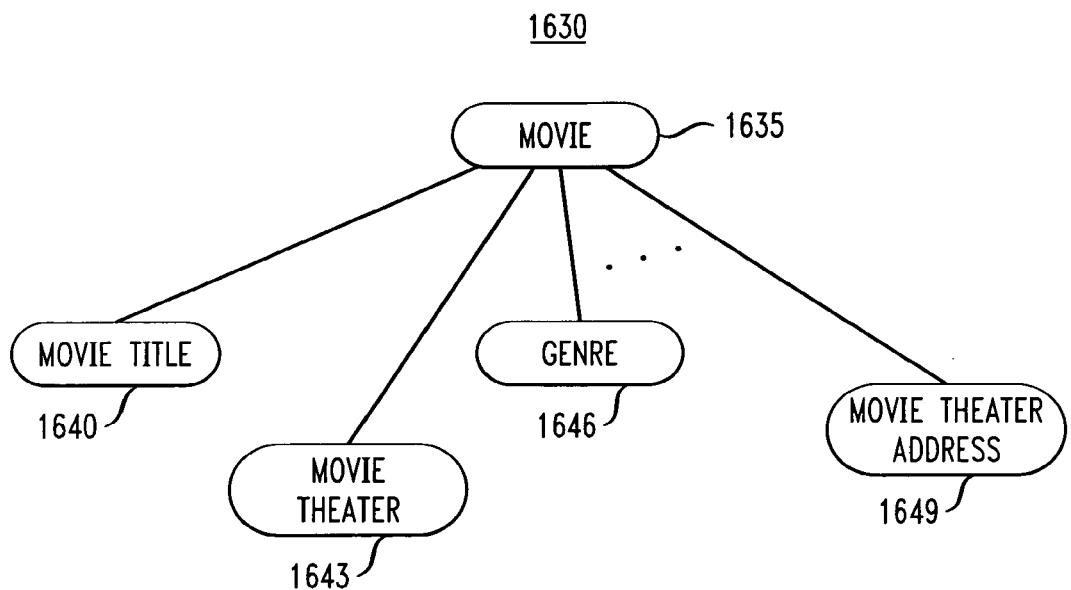
FIG. 8 is a tree representation for deriving context information from a movie-related information assistance call, in accordance with one embodiment of the invention.

To effectively derive context information during an information assistance call, context information trees are used for different call contexts. By way of example, but not limitation, FIG. 8 illustrates context information tree 1630 used for an information assistance call relates to a movie (indicated by root node 1635), e.g., an inquiry about show times of a desired movie at a selected theater, a request for ordering tickets therefor, etc. According to tree 1630, context information engine 1607 during one such call attempts to derive context information concerning the title of the movie desired by the user (indicated by leaf node 1640), the name of the selected theater (indicated by leaf node 1643), the genre of the desired movie (indicated by leaf node 1646), and the address of the selected theater (indicated by leaf node 1649).

Figure 9:
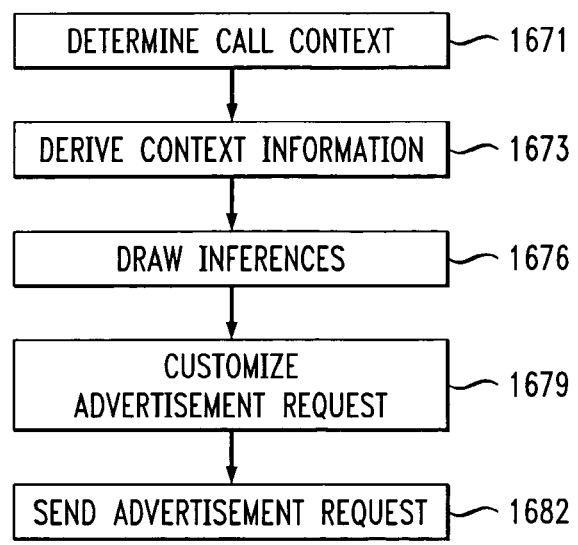
FIG. 9 is a flowchart depicting a process for achieving call context-based advertising, in accordance with one embodiment of the invention.

It should be noted that not all context information can be extracted directly from the aforementioned vocal and/or data exchanges in an information assistance call. For the context information which is not explicit from the exchanges, engine 1607 conducts inquiries and searches based on known information. Take the above illustrative exchanges between a user and an operator for example. Referring to FIG. 9, engine 1607 at step 1671 determines that the call context relates to a movie based, e.g., on the word "movie" mentioned in the exchanges. At step 1673, engine 1607 derives the context information according to context information tree 1630. Specifically, engine 1607 extracts the context information concerning the movie title (e.g., Ghostbusters II) and the name of the movie theater (e.g., Sony Multiplex Theater) directly from the exchanges. However, for the genre of Ghostbusters II and the address of the Sony Multiplex Theater which are not explicit from the exchanges, engine 1607 may inquire therefor. For example, engine 1607 may send to concierge server 146 an inquiry about the genre of the movie based on the movie title—Ghostbusters II. In response to one such inquiry, server 146 searches a movie listing database, and returns to engine 1607 an indication that the movie is a comedy in this instance. In addition, engine 1607 may send to concierge server 146 an inquiry about the address of the movie theater based on the name of the movie theater and city/town therein—Sony Multiplex Theater, Manhattan. In response to one such inquiry, server 146 searches a movie theater listing database, and returns to engine 1607 the theater's address.

Based on the context of the call, engine 1607 at step 1676 draws inferences as to what advertisements are pertinent to the anticipated event (i.e., movie), location (i.e., movie theater), etc. of the user. For example, based on a set of predetermined inferential rules designed for the movie-related call context, engine 1607 may infer that the user will be in the Sony Multiplex Theater showing the movie, assuming in this instance that the Sony Multiplex Theater is the last theater about which the user inquired in the information assistance call. Engine 1607 determines that a first type of advertisement concerning the Sony Multiplex Theater facilities, e.g., a coupon code for a discount on snacks and beverages at the theater's refreshment concession, is relevant in anticipation of the user being in the theater. Further, engine 1607 may infer that the user must like the particular movie for which the user purchases the tickets. As such, engine 1607 determines that a second type of advertisement concerning merchandises relating to the movie, e.g., T-shirts promoting Ghostbusters II, music CDs containing the soundtrack of the movie, DVDs of a past release (e.g., Ghostbusters) or previews of a future release of any sequels or prequels of the movie or related movies, etc. is relevant. Moreover, engine 1607 may infer from the genre of Ghostbusters II, i.e., comedy, that the user would enjoy a similar type of entertainment. As such, engine 1607 determines that a third type of advertisement concerning, e.g., other comedic shows, plays, movies, literature, books, etc. is relevant. In addition, engine 1607 may infer that the user would be in the vicinity of the Sony Multiplex Theater some time before and after the movie. As such, a fourth type of advertisement concerning, e.g., a restaurant, bar, dining facility, nightclubs, etc. in the vicinity of the movie theater is relevant, particularly to a movie-goer.

Engine 1607 may request concierge server 146 to identify advertisements of those four types determined above, which are available in system 10. For example, engine 1607 may formulate a request, which contains the address of the Sony Multiplex Theater, for advertisements of any restaurants within a predetermined distance, say, one mile, of the theater's address. However, an object of the information assistance service is to limit the number of advertisements sent to a user, and at the same time provide useful information to the same. To that end, engine 1607 at step 1679 customizes the advertisement request to provide more targeted advertisements to the user. For example, knowing from the user profile (described below) that the user prefers a particular cuisine, say, Italian, engine 1607 individualizes the request, resulting in a request for advertisements of Italian restaurants within one mile of the theater's address. At step 1682, engine 1607 sends the advertisement request to concierge server 146. The latter then searches a restaurant listing database for any Italian restaurants which satisfy the request and for which advertisements are stored and maintained in system 10. After identifying one or more such Italian restaurants, concierge server 146 transmits advertisement code(s) identifying the advertisements therefor to information server 32 through WAN 40. In response, information server 32 retrieves the advertisement(s) from storage (not shown) based on the received code(s) and, in one embodiment, causes voice server 134 to provide the advertisements to the user in automated voice at the closing of the information assistance call.

FIG. 10 illustrates user profile record 1500 associated with an account-user in this instance. Record 1500 contains user preferences including those initially specified by the user during a registration, which may be subsequently updated. As shown in FIG. 10, record 1500 includes such user preferences as how the user wishes to be addressed by the operator (e.g., "Mary" denoted 1520) and what language he/she prefers when interacting with system 10 (e.g., "Spanish" denoted 1530).

In another embodiment, knowing the user's language preference, i.e., Spanish in this instance, context information engine 1607 in step 1679 in FIG. 9 further requires that the call context based advertisements to be delivered to the user be in Spanish.

In addition, record 1500 contains the user's personal interests 1540, which may be used for tailoring the call context based advertisements described above to the user. For example, at the conclusion of an information assistance call, such advertising information may be "pushed" to the user, subject to any opt-out provision 1555 in the profile record. In this instance, the user specifies as part of personal interests 1540 preferred music, e.g., Beatles, Rolling Stones, etc.; fashion, e.g., Versace, Donna Karen, etc.; sports events, e.g., Knicks basketball games, PGA Golf tournaments, etc.; and cuisine, e.g., Italian.

The call context based advertisements may also be delivered to the user via alternative forms and/or methods, e.g., SMS, e-mail, WAP, voicemail, facsimile, paging, instant messaging, text messaging, video phone, picture phone, etc. For example, the actual method(s) of delivery of the advertising information may be specified by the user in user profile record 1500, shown as information delivery method preferences 1550. Such information delivery method(s) may be established in the initial registration by the user in response to such direct questions as "How do you want advertising information to be transmitted to you from an information assistance service?" The answers to such direct questions may make up preferences 1550. The specified delivery methods may be prioritized in accordance with the user's preferences.

In accordance with another aspect of the invention, one or more parameters of a subscriber account may be monitored, which may include usage limits on use of the information assistance service, purchases of products or services, etc. by the respective individual users of the same account.

Examples of usage limits (e.g., imposed by a parent/subscriber) may include limits on the total number of information assistance calls by an individual user (e.g., a child/user), the number of calls per time period (10 calls per month, for example), the total charges in dollars of calls made, the total charges in dollars per time period, the duration of individual calls or the type of information assistance requested (domestic or foreign, for example) that may be made and billed to a particular subscription and/or credit card number supporting the subscription. Usage limits on other transactions such as purchases by an individual user through the concierge service may also be imposed. For example, as shown in FIG. 10, the usage limit on purchases of entertainment related services 1560 (e.g., movies, sports events) by the user associated with profile record 1500 is specified, which is $200 in total per month. The usage limit on purchases of food and beverages 1565 (e.g., restaurant take-outs) is also specified, which is $10 per purchase.

The subscriber in this instance also specifies the method(s) of payment for use of the information assistance service and purchases by the individual users. The payment method data may be stored in the subscriber folder, and may be applied to all of the users to the same subscriber account. For example, the payment method data may include credit card information concerning the subscriber's MasterCard account and American Express account. It will be appreciated that other methods of payment, including debit cards, lines of credit, payroll deductions, prepayments, electronic wallets, funds transfer, etc. are also feasible. In this instance, the subscriber preauthorizes that all information assistance services are charged to the MasterCard account, and all other transactions including purchases through the concierge service are charged to the American Express account. The methods of payment can readily be established with the help of an operator or a service menu by voice server 134.

Having the user charge information on record facilitates provision of the concierge service by the information assistance service provider. For example, when a user calls the service provider for a movie listing, the operator not only can provide the movie titles, and the corresponding show times and locations of the theaters, but also can offer to purchase tickets for the user in advance for a desired movie at a desired theater using charge account information on record, in accordance with the user's preauthorization. The user may then pick up the tickets at the movie theater or simply verify the ticket order at the door to gain admission. Other ticket purchases for sports games, concerts, operas, plays, shows, etc. may be similarly conducted. Likewise, when a user requests hotel information from an operator, the operator can offer to make a hotel reservation for the user using charge account information on record, subject to the preauthorization.

Monitoring of a usage limit of a particular type of purchase, say, entertainment related services, will now be described. The level of usage may be tracked in the user's profile record in information database 34. Switch host computer 108 may be programmed to inform information server 32 of each call initiated by the user when a call is received. Information server 32 may be programmed to update the level of usage in the profile record when each call is made, or to periodically update the level of usage. Information server 32 may also be programmed to compare the usage limit to the current level of usage.

Figure 11:
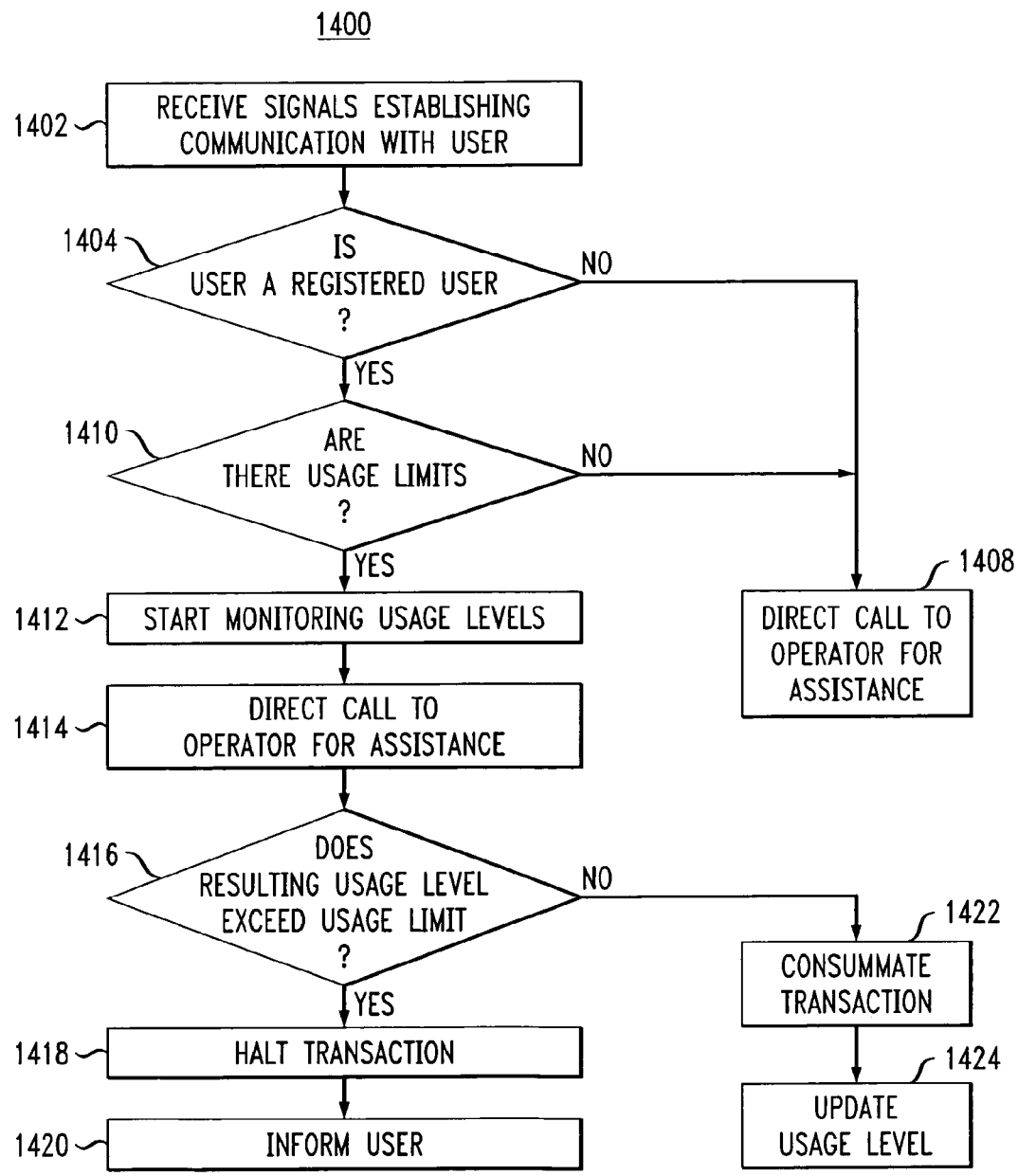
FIG. 11 is a flowchart depicting a process for monitoring a usage limit specified in the user profile record.

Referring to FIG. 11 illustrating a routine (denoted 1400) for monitoring a user's usage limits, signals establishing a communication with the user are received in step 1402 and the status of the user as a registered user is determined in step 1404. If the user is not a registered user, the call may be directed to an operator for information assistance in step 1408.

As fully described above and further described below, the determination of a registered user in this instance involves identifying an ANI contained in the communication setup signals and obtaining a voiceprint sample of a passphrase or password uttered by the user. For example, switch host computer 108 may be programmed to inform information processor 32 of the ANI of the call, to determine if the ANI is associated with a subscriber account. If information server 32 identifies a subscriber folder corresponding to the ANI, information server 32 may be further programmed to verify any voiceprint matching the voiceprint sample provided by the user. The matching voiceprint is used to identify the user profile record, say, 1500 within the subscriber folder. User profile record 1500 is then provided to computer 108 through profile gateway 124.

Computer 108 determines whether there are usage limits specified in profile record 1500, as indicated in step 1410. If not, routine 1400 proceeds to aforementioned step 1408. Otherwise, if there are usage limits, computer 108 in step 1412 starts monitoring the respective usage levels tracked in record 1500. The call is then directed to an operator for assistance, as indicated in step 1414.

By way of example, the caller in this instance requests the operator to purchase movie tickets through the concierge service. Further suppose the current level of usage corresponding to the entertainment related services is $180 this month to date, registered in profile record 1500. When the operator conducts the movie ticket purchase which is coded to be entertainment related, the movie tickets' price entered by the operator is added by computer 108 to the current level of entertainment related usage, i.e., $180. Computer 108 in step 1416 determines whether the resulting level of usage exceeds the corresponding usage limit 1560, i.e., $200. If so, computer 108 in step 1418 halts the transaction, and informs the operator of the shortage. The operator in turn informs the user of the shortage, as indicated in step 1420. The user may then change the number of movie tickets to be purchased to make it within usage limit 1560. Otherwise, if the resulting level of usage does not exceed usage limit 1560, the transaction is consummated, as indicated in step 1422. In addition, computer 108 in step 1424 updates the current level of entertainment related usage to include the transaction amount.

Obtaining a voiceprint sample for identifying information and preferences may involve asking a user to repeat a particular passphrase or password multiple times, thereby likely causing the user to become nervous and speak unnaturally. It may also increase the time required to register a user, which may be ineffective. In accordance with an embodiment of the invention, voiceprint samples are derived from verbal utterances during registration of the user. For example, during registration of a new user, the new user is typically asked for their name, address, phone numbers of wireline or wireless phones or communications numbers of other communications devices they may use, a password, a PIN, credit card information to pay for the subscription, etc. The new user verbally provides this information in response to queries by an operator, account representative or voice server 134.

A voiceprint sample may be derived based on the verbal utterances of the users during the registration process. SpeechSecure™, for example, may derive a voiceprint sample in a text independent mode, where a speaker does not follow a predetermined script (such as repeating a passphrase or password). The user's verbal utterances may be readily distinguished from that of the operator's by changing the state of the connection between the operator and the user. For example, the connection may be changed from a two way to a one way conference connection, for example, FIG. 12 is an example of a process 200 in accordance with this embodiment of the present invention, whereby a new user to information assistance service system 10 is registered with the system, in step 202. Text independent verbal utterances are recorded in step 204, as the user is speaking to the operator and providing registration information. The recorded utterances are processed into a voiceprint sample, in step 206. For example, text independent processing may be used to derive the voiceprint sample.

Generally, the greater the number of voiceprints obtained, the more accurate the resulting voiceprint sample or samples, and thus the more accurate the voice verification. As mentioned above, however, requesting a user to repeat words or phrases too many times during registration may annoy the user and may result in an unnatural speaking voice. In accordance with another embodiment of the invention, additional voiceprints are collected to "fine tune" an existing voiceprint sample, by conferencing or otherwise tapping voiceprint gateway 136 into conversations between users and operators of system 10, to collect additional verbal utterances in a text independent mode. Alternatively, the call may be connected to voiceprint gateway 136 and the operator may be conferenced in. The operator may also be in listen-only mode on the same channel. The operator's voice and the caller's voice may thereby be readily distinguished.

FIG. 13 is an example of a process 300 in accordance with this embodiment of the invention. A call is connected to an operator in step 302. The call could be connected to voice server 134, instead. Voiceprint gateway 136 is conferenced into the call, in step 304. Switch host computer 108 may conference voice server 134 into the call, for example.

Voiceprint samples are collected in step 306. Voiceprint gateway 134 may record and digitize voiceprints of the subscriber and send them to information server 32, as discussed above, for example.

The digitized voiceprints are analyzed and processed, in step 308. Information server 32 may first determine whether the voiceprint is acceptable for use as a sample. For example, voiceprints including too much noise or not enough energy may be rejected. Information server 32 may average acceptable voiceprints with the existing voiceprint sample, for example. Alternatively, a new voiceprint sample may be derived from the new voiceprints, in combination with the original voiceprints collected during registration (which may have been saved). The new voiceprints may replace voiceprints of lesser quality in derivation of a new voiceprint sample, as well. The new voiceprints may be weighted based on environmental or other such factors. For example, a voiceprint that is acceptable but contains more than a predetermined amount of noise may be weighted to have a lower contribution to the new voiceprint sample than a voiceprint with less noise. Such processing may be performed by voiceprint gateway 136 instead of or along with information server 32.

As discussed above, voiceprints of authentic callers may not sufficiently match their voiceprint sample, due to noise and other factors associated with the phone used to call system 10. In accordance with another embodiment of the invention, a voiceprint comparison threshold is adjusted based on the source of the call. For example, a threshold set for a wireline phone, which typically has less noise and broader bandwidth than a wireless phone, may be lowered if a call is from a wireless phone or speakerphone, to allow for the increased noise typically present.

FIG. 14*a* is an example of a process 400 in accordance with this embodiment of the invention. A phone type used to make a call to system 10 is determined, in step 402. Phone type may be determined in a variety of ways. For example, during registration, a new subscriber may identify the type of phone associated with each phone number registered with system 10, as a wireline, wireless or speakerphone, for example. The phone type may be stored in a table associated with the phone number. The table may be part of the subscriber profile and/or may be part of another file. Information server 32, profile gateway 124 or switch host computer 108 may determine the phone type based on this information.

The type of phone associated with the ANI/MIN may also be determined by the Telcordia Local Exchange Routing Guide (LERG), such as LERG6, based on the first six digits of the ANI. System 10 may also identify the operating company associated with an ANI to determine if the phone is a wireline or wireless phone, also through LERG6.

The threshold is set based, at least in part, on the phone type, in step 404. For example, if a first threshold is used for wireline phones and it is determined that the phone type is a wireless phone or a speakerphone, the threshold is changed in accordance with this embodiment. Different, lower thresholds may be used for wireless phones and speakerphones, or the same lower threshold may be used. For example, if the default upper threshold is 600, it may be lowered to 550 for a speaker phone and to 500 for a wireless phone. Appropriate thresholds may be determined to decrease the rejection of authentic subscribers to a desired level, based on use of the system, over time, for example. No threshold may be set until the phone type is determined, or the system may have a default threshold that is used unless it is determined that the threshold should be changed based on phone type. The default setting may be the appropriate threshold for either a wireline phone or a wireless phone, depending on the most common phone type among subscribers of system 10. The threshold may then be set to a different level if the phone type of the phone used to make a particular call is different than the phone type of the default setting. Information server 32, voiceprint gateway 136 or switch host computer 108 may set the threshold, for example.

Continuing with the example of process 400, a voiceprint of the caller is received, in step 406, and compared to a voiceprint sample, in step 408, to yield a confidence score. The voiceprint confidence score resulting from the comparison between the received voiceprint and the voiceprint sample is then compared to the set threshold, in step 410, to verify the identity of the caller/subscriber. Multiple thresholds may be used, as discussed above, such as an upper and lower threshold.

To implement steps 406 through 410, voiceprint gateway 136 may receive, record and digitize the voiceprint and transmit the voiceprint to information server 32. Information server 32 may retrieve the voiceprint sample from information database 34 and compare it to the voiceprint to yield the confidence score.

System 10 may also learn over time that a phone associated with an ANI typically has higher than expected noise. Information server 32 can monitor the acceptable confidence scores based on a particular phone and compare them to confidence scores of other phones of other parties. If the scores are closer to the threshold than is typical, the system may assume that there is more than an average amount of noise on that phone. The threshold may then be lowered an appropriate amount to ensure that an authentic subscriber using that phone will not be rejected.

While the risk of an authentication of an improper party goes up as the threshold is lowered, this risk is mitigated by other identification techniques, such as use of the ANI to make the preliminary identification of the caller. That risk is also offset by the risk of annoying users due to excessive false negative determinations.

The voiceprint comparison threshold may also be set based on the type of service requested. If the requested service is a credit card purchase, for example, a higher degree of certainty is required and the threshold may be raised. Additional indicia of identity may also be requested, such as the caller's PIN.

Instead of changing the threshold based on phone type, as in process 400 of FIG. 14*a*, in accordance with another embodiment of the invention, different voiceprint samples may be derived from voiceprints collected from different respective registered phones. When a user uses a particular phone, the respective voiceprint sample derived from use of that phone, is used for comparison and generation of a confidence score.

Figure 14B:
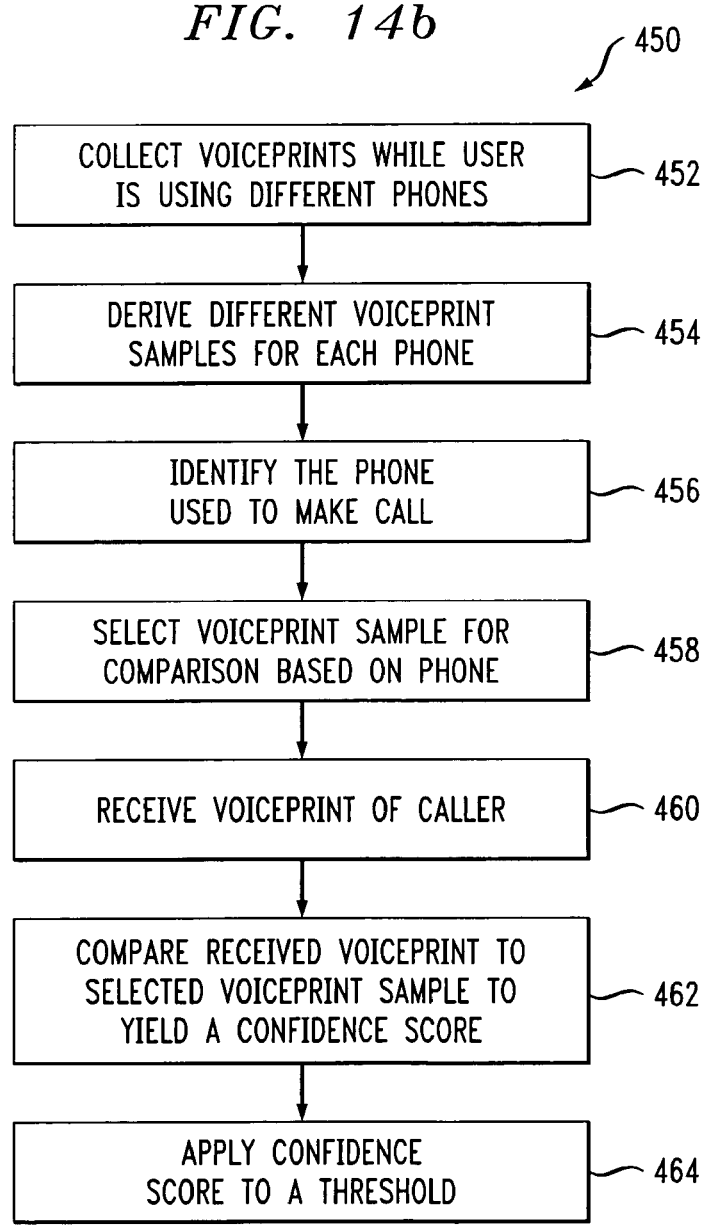
FIG. 14b is a flowchart depicting a process for using a different voiceprint sample, dependent on a phone used to call the system.

FIG. 14*b* is an example of process 450 in accordance with this embodiment of the invention. Voiceprints are collected while the user is using different registered phones, for the purpose of deriving different voiceprint samples for each phone. To collect the different voiceprint samples, the subscriber may call system 10 from each registered phone and repeat the passphrase or password while using each phone, for example.

System 10 derives a voiceprint sample from voiceprints received while the user uses each phone, in step 454. System 10 may store each voiceprint in association with an identifier of each phone, such as the ANI of each phone, in the subscriber's folder in information database 34, for example.

When the user calls system 10, the registered phone is identified in step 456, as described above. The voiceprint sample to be used for comparison is selected in step 458, based on the identified phone. For example, the voiceprint sample selected may be the voiceprint sample associated with the identifier of the phone used to call system 10.

The voiceprint of the caller is received in step 460 and compared to the selected voiceprint sample, in step 462, to yield a confidence score. The confidence score is compared to a threshold (or multiple thresholds) to authenticate the caller, in step 464. Step 460 through step 464 have been discussed above in detail.

If a subscriber's phone number has changed or the subscriber has moved, there is a risk that the subscriber's registered phone number has been reassigned. A call from the registered ANI/MIN of the subscriber may not, therefore, be coming from the subscriber or the associated user. In accordance with another embodiment of the invention, system 10 monitors changes in subscriber's phone numbers and/or addresses, based on information provided by network carriers, for example, and flags accounts of subscribers who have such changes. The threshold for voiceprint verification for calls received from a phone registered with a flagged account may be raised. For example, if a 75% threshold level is acceptable under normal circumstances, a threshold of 90% may be used for flagged accounts. If that threshold is not met, an operator or voice server 134 may request additional identifying information from with caller. If the caller is not the actual subscriber, an account may be established with the caller. The prior account may be put on hold until the subscriber is contacted or the subscriber contacts system 10 to update their profile and provide a new phone number.

FIG. 15 is an example of a process 500 in accordance with this embodiment of the invention. Changes in phone numbers and/or addresses of subscribers to system 10 are monitored to determine if there are any changes, in steps 502 and 504. Network carriers provide information relating to changes in phone numbers and addresses of their customers to directory assistance and information assistance service systems regularly (daily, for example), so that these services may update their databases. Files of the changes may be compared to files of subscribers of system 10 to identify those subscribers with changed phone numbers and/or addresses. Information server 32 may receive the files of changes from the networks carriers and compare them to files of subscribers.

If a customer's phone number and/or address has changed, their account is flagged, in Step 506. Information server 32 or profile gateway 134 may flag such accounts.

Handling of a call from a caller who may have a flagged account is now described with respect to process 500. A call is received in step 508 and an account is identified, in step 510. The account may be identified based on the ANI, as discussed above, for example. The identified account is checked for a flag, in step 512. Information server 32 may retrieve and check the subscriber folder corresponding to the ANI, for example. Profile gateway 124 and/or switch host computer 108 may also check for the flag. If the account is flagged, the voiceprint threshold is raised, in step 514. Information server 32 may change the threshold, as discussed above with respect to FIG. 14a. If multiple thresholds (upper and lower thresholds, for example) are used, the upper threshold may be changed. A voiceprint of the caller is received, in Step 516. The voiceprint is compared to a voiceprint sample associated with the account to derive a confidence score, in Step 518, as discussed above. The confidence score is compared to the voiceprint threshold, in step 520, as is also discussed above.

If the threshold is met (step 522), the call proceeds. Service may be provided, in step 524. If the threshold is not met, the operator or voice server 134 communicates with the caller to determine if the caller is the expected user associated with the account or another caller, in step 526. Customer identity may be verified by providing a PIN associated with the account or by providing personal information (mother's maiden name, PIN, for example) previously registered with the account, as discussed above. If the caller is not the customer, a subscription may be offered.

As described before, voiceprints may be used to individualize user profiles, particularly where the subscriber account covers multiple parties. For example, a family or business may be covered by a single account. Where the customer account is determined based on an ANI or MIN of the one or more wireline or wireless phones that are part of the account, each member of the family or business is typically treated the same. Voiceprints facilitate the access of profiles for each party to the account. The profiles may include individual preferences of that particular user. For example, each profile may contain the name or nickname by which a respective user wishes to be addressed by the system, and the language in which they prefer to communicate. System 10 may thereby respond to a call from different users sharing an account, differently. The account may be identified based on the ANI while a user profile may be identified based on the voiceprint of the user.

As discussed above, communications systems, such as information assistance service system 10 and network carriers, may provide targeted promotional and informational messages to an individual user during a communication with the user. To avoid saturating a user with the same message, which may annoy the user, the message may only be played periodically.

In accordance with this embodiment of the invention, a voiceprint of a user to the system is used to identify an individual user to an account, for the purpose of monitoring message limits. In one example, each user to the account may select the frequency that they would like to receive the same message or any message. One party (such as a parent) may select the frequency for other parties (children, for example), as well. In another example, system 10 may determine the frequency. A system may implement any or all of these options. The frequency may be every third or fifth call, for example. Each party or system 10 may also select the total number of time's they would like to hear the same message. The number of calls by each users since the last message was played, is monitored for each user, based on the voiceprint. The effectiveness of the messages may be increased and their potential annoyance decreased.

Figure 16:
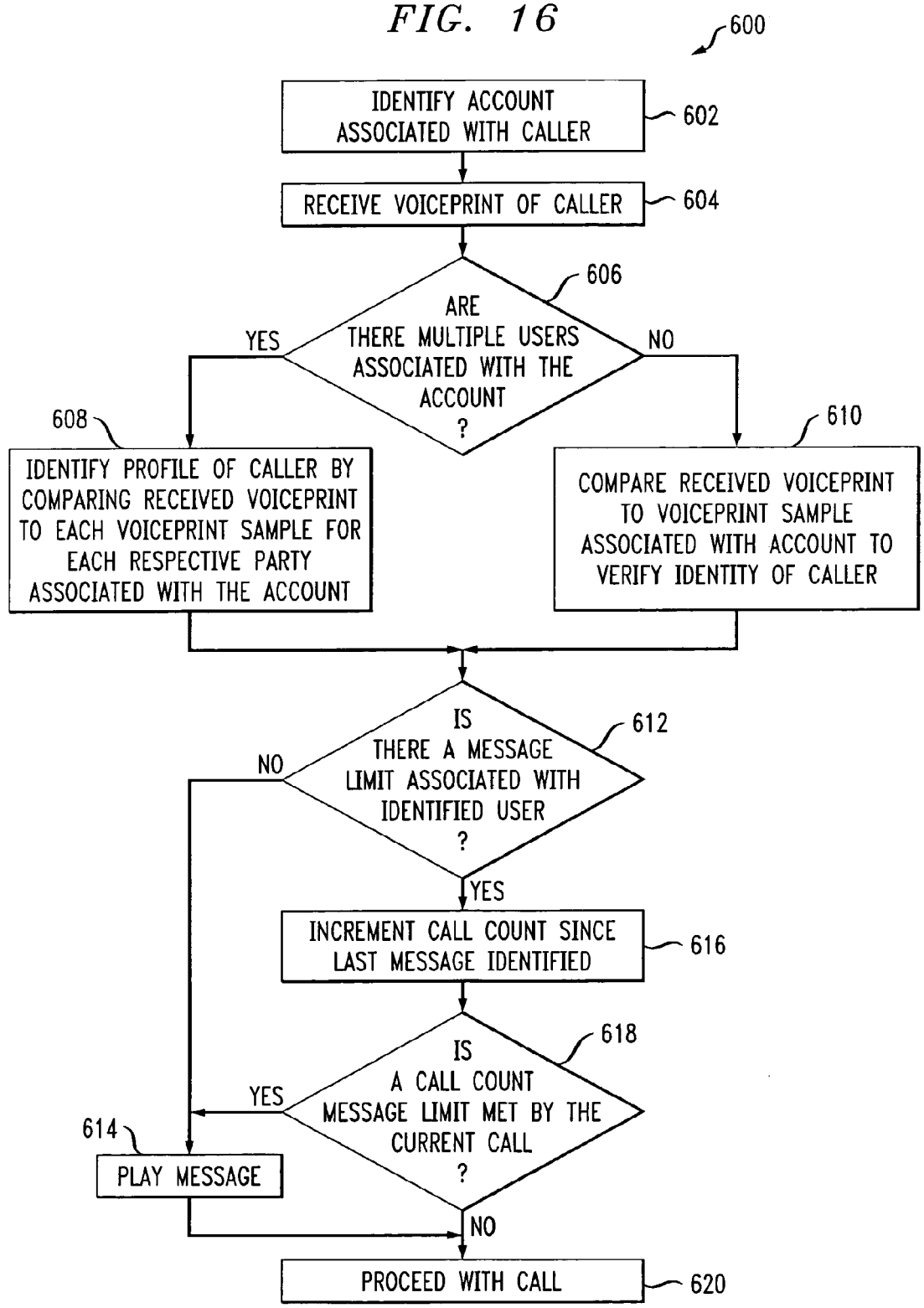
FIG. 16 is a flowchart depicting a process for setting message limits for each party of a multi-party account, in accordance with another embodiment of the invention.

FIG. 16 is an example of a process 600 in accordance with this embodiment of the invention. The account associated with a caller is identified, in Step 602. As discussed above, the account may be identified based on identifiers in the call setup signals, such as the ANI.

A voiceprint sample of the caller is received, in Step 604. It is then determined whether there are multiple parties associated with the account, in Step 606. Information server may make this determination by checking the subscriber record associated with the account, for example.

If there are multiple parties associated with the account, the caller is identified as one of those parties by comparing the received voiceprint sample to each voiceprint, generating confidence scores and comparing the confidence scores to the threshold, in Step 608. This has been discussed in detail, above. If the confidence score resulting from only one voiceprint sample meets the threshold, the caller is identified as the user associated with that particular voiceprint sample. If the confidence score resulting from several voiceprint samples meets the threshold, the caller is identified as the party associated with the sample yielding the highest confidence score above the threshold. This has been discussed in detail, above. As above, multiple thresholds (an upper and a lower threshold, for example), may be used.

If there are not multiple parties associated with the account, the received voiceprint is compared to the voiceprint sample to verify the caller as the one subscriber associated with the account, in Step 606. This process has been discussed in detail above, as well.

It is then determined whether there are any message limits associated with the account of the identified party, in Step 612, by checking the user profile of the identified user. A promotional information message limit, e.g., 1570 in profile record 1500, may be established by the user or alternatively by system 10. If there are no message limits, a message may be played in Step 614.

If there is a message limit, a call count since the last message was played is incremented, in Step 616, and it is then determined whether the limit is met by the current call, in Step 618. For example, if the message limit is five calls, messages may only be played every fifth call. If the current call increments the call count to 5, then the call count is met in Step 618. A message may then be played in Step 614, after which, the call may proceed in an ordinary manner in Step 620. If the call count is not equal to the message limit, then no message is played and the call proceeds in an ordinary manner, in Step 620. Information server 32 may increment the call count in the user profile record, and determine if the current call count meets the message limit, for example.

As discussed above, use of a PIN to identify a particular member of an account for billing and other purposes, is problematic. In accordance with another embodiment of the invention, the attribution of individual calls by each member of a joint account may be simplified by the use of voiceprints. When a particular user of an account including multiple users calls system 10, that individual may be identified by their voiceprint. Once identified, an identifier of the individual may be inserted into a call detail record (CDR) for that communication. A billing record and/or a bill including the identifier may be readily prepared based on the CDR. A user may also request that certain other users to the account be grouped (such as the children in a family), while others (such as each parent) are listed separately.

As discussed above, the CDR is provided to billing platform 50, that correlates other CDRs for that call, as well as CDRs for other calls attributed to a particular account, in preparation for bill generation. In a bill for a joint account, calls attributable to each party to the account are thereby identified and may be listed separately. The identifier of each individual may be a name of the user, a nickname, a PIN or other such number assigned to or selected by each user, a phone number of the phone used to call the system or a department number of a business, for example. The identifier may be inserted into a CDR by voiceprint gateway 132, for example. The billing platform may be part of the system 10, a network carrier or part of a third party, as discussed above.

Figure 17:
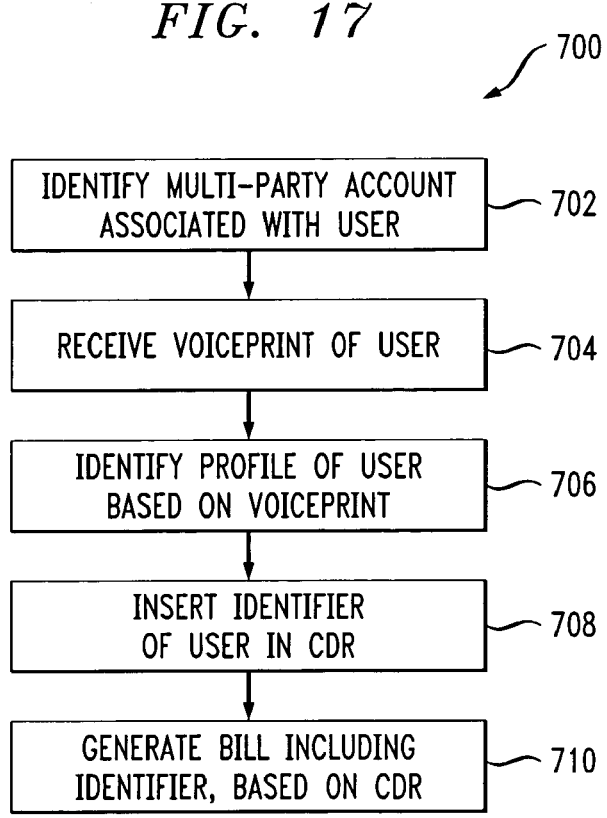
FIG. 17 is a flowchart depicting a process for allocating calls to particular parties of a multi-party account, in accordance with another embodiment of the invention.

FIG. 17 is an example of a process 700 in accordance with this embodiment of the invention. The account associated with a caller is identified, in Step 702. As discussed above, the account may be identified based on the ANI in the call-setup signals. A voiceprint of the caller is received, in Step 704, by voiceprint gateway 136, for example. If there are multiple parties associated with the account, the identity of the caller is determined based on the voiceprint, in Step 706, as described above with respect to method 600 (FIG. 16), for example. An identifier of the caller is then inserted into a CDR, in Step 708, by voiceprint gateway 136, for example. A bill including the identifier may be generated in step 710.

Figure 18:
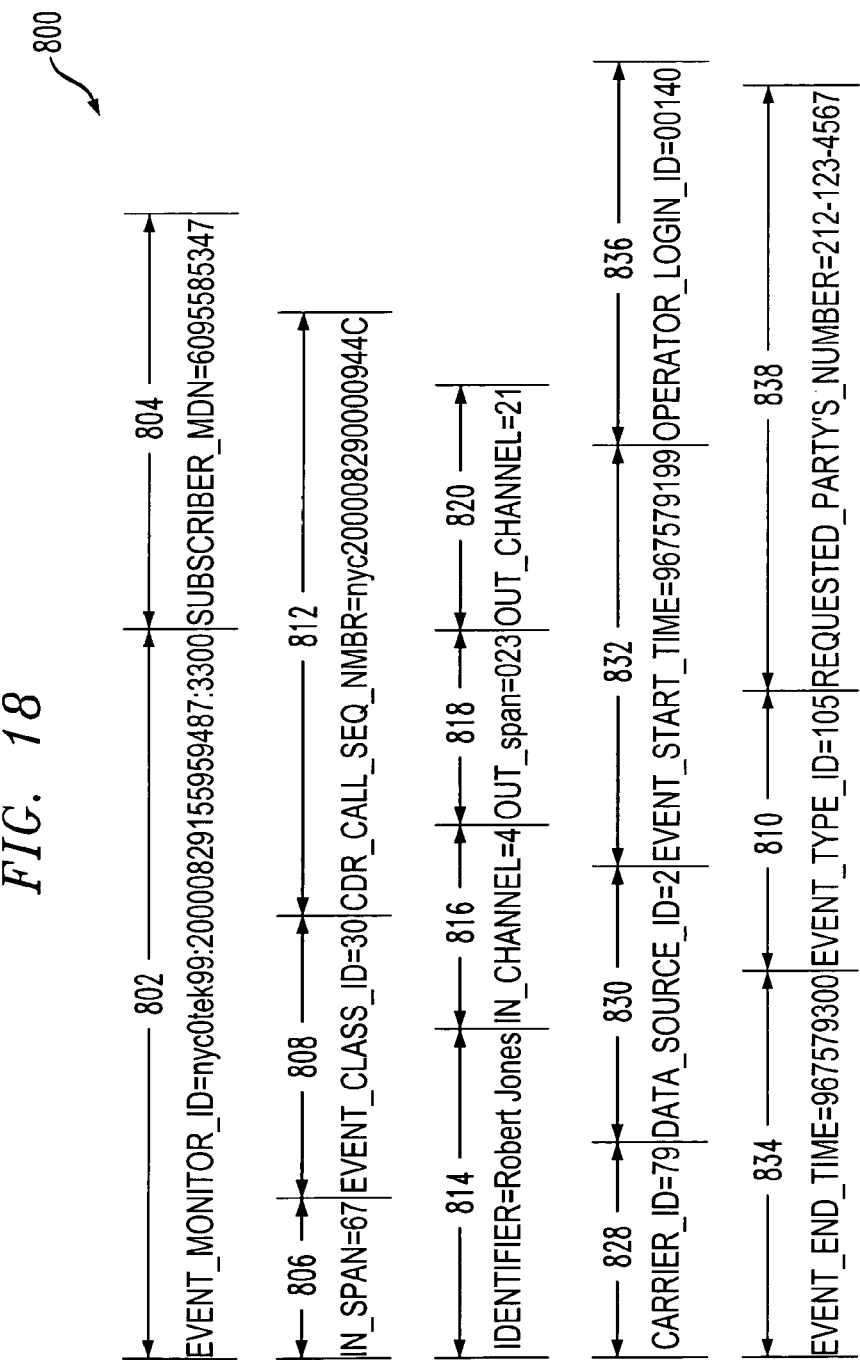
FIG. 18 is an example of a call detail record including an identifier of a particular party of a multi-party account, for use in the process of FIG. 17.

A standard CDR may be readily modified to include a field for such an identifier. FIG. 18 illustrates an example of a CDR 800 that may be generated by voiceprint gateway 136 and IASP 100, for example, to document an identification of a user of a voiceprint information assistance search during an information assistance call. CDR 800 may include multiple fields describing an information assistance communication. Specifically, EVENT_MONITOR_ID field 802 contains a sequence of alphanumeric characters uniquely identifying CDR 800. SUBSCRIBER_MDN field 804 identifies the telephone number of the user who made the information assistance call, i.e., the ANI or MIN. IN_SPAN field 806 identifies the T1 span transporting the incoming communication of the information assistance call.

EVENT_CLASS_ID field 808 is an optional field that may be used to identify a class of an event where CDRs are generated for multiple events, as described in application Ser. No. 09/777,061, discussed above. For example, the value "30" in field 811 in this instance, corresponds to a SEARCHES class. Other values for field 211 may correspond, e.g., to CALL PROCESSING, VALUE ADDED SERVICE and LOCAL SERVICES classes. Another field, here EVENT_TYPE_ID field 810, specifies one of the event types within the class identified by the value in field 808. For example, the value "105" in field 810 in this instance, corresponds to a search for a number of a requested party event, within the SEARCHES class. Similarly, other values for field 810 correspond to different types of events in an identified class.

CDR_CALL_SEQ_NMBR field 812 contains a sequence number identifying the information assistance call in question. If multiple event records are generated in the same information assistance communication to document different events taking place during the communication, as described in application Ser. No. 09/777,061, for example, they would share the same value in field 812. In that way, billing compiler 54 may identify and compile event records related to the same communication, as discussed above. Sequence numbers are generated and assigned by switch host computer 108, when the information assistance call is initially received by servicing switch 106. Host computer 108 then transmits the sequence number to switch 106, and any other component in IASP 100 that may generate an event record. For example, the sequence number for a call may be transmitted to operator terminal 116, voice server 134 and database server 120 to be incorporated in any CDR they generate, for that particular call. Such a sequence number may also used by other components in system 10, e.g., information server 32, concierge server 146 and context information gateway 149 to track and/or reference the particular call.

In accordance with this embodiment of the invention, IDENTIFIER field 814 contains an identifier of the user calling the system in that call. As described above, when there are multiple parties to an account, such as family members or business employees, the individual user making the call may be identified by his/her voiceprint. The identifier may be the name, nickname or password of the calling party, a business department or division, etc.

IN_CHANNEL field 816 identifies the channel (within the T1 span identified by IN_SPAN field 406 described above), which the incoming communication of the information assistance call traverses. OUT_SPAN field 818 identifies the T1 span transporting the outgoing communication of the information assistance call, if any. OUT_CHANNEL field 820 identifies the channel (within the T1 span identified by field 818) which the outgoing communication of the information assistance call traverses, if the communication is connected to the requested party's communications number, for example.

CARRIER_ID field 828 identifies the network carrier used to connect the call. For example, the value "79" in field 828 identifies AT&T Corp. as the carrier in this instance. DATA_SOURCE_ID field 830 identifies the component of IASP 100 generating record 800. EVENT_START_TIME field 832 indicates the start time of the communication event in question. It should be noted that the value in field 832 corresponds to a UNIX "epoch" time, i.e., the number of seconds elapsed from Jan. 1, 1970. Similarly, EVENT_END_TIME field 834 indicates the end time of the event in question. Thus, with such event start and end times, the duration of the event in question can be determined, which may be used in computing charges for that call. OPERATOR_LOGIN_ID field 836 identifies the operator handling the event. The REQUESTED_PARTY'S_NUMBER field 838 may contain the retrieved number of the requested party.

Records of events that occurred in a call may be correlated by the same sequence identification number, such as CDR_CALL_SEQ_NMBR field 812. Each information assistance call is associated with customer information, such as ANI or SUBSCRIBER_MDN field 804 information and/or a customer identification number assigned by the carrier.

Other fields, different fields and fewer fields may be provided in CDR 800, as desired or needed by the system 10.

CDR 800 includes all the information necessary for computation of charges for each call, so that bill processing may be readily performed. An additional field or fields may be provided in the bill for indicating the identifier of the party making a particular call. Calls attributable to particular parties to an account may be listed separately in a bill for an account under the identifier of that party or each call may indicate the identifier of the party making the call. A bill may be readily formatted to provide such a field by CDR server 36 or by information server 32, for example.

Further, concierge requests in information assistance calls attributable to an individual user are recorded in CDRs, as well. Data regarding the individual user's purchases through the concierge service may be derived from such CDRs, which may be used to measure the effectiveness of the targeted advertising and promotional messages to the user. Such data may also be used for more individualized customer service and marketing, e.g., pushing to the user more promotional and advertising messages geared towards those types of concierge requests and purchases by the user.

In addition, IASP 100 may be configured differently from the configuration of FIG. 2. FIG. 19 is an example of an alternative IASP 900. Components common to IASC 100 are commonly numbered. In IASP 900, call interface 902 is not connected to servicing platform 104, as in IASP 100. Instead, the functionality of servicing platform 104 principally is carried out in carrier network 904. Control device 906 in network 904 performs similar functions to switch host computer 108, and carrier switch 908 performs not only its conventional carrier switching functions, but also those of servicing switch 106 described above, under control of device 906.

In IASP 900, a communication, such as an information assistance call, is recognized by control device 906 when it is routed through carrier switch 908. Device 906 causes the communication to be connected through one of pre-designated direct inward dial (DID) connections 910 to provider 900. Control device 906 may also be connected to IASP 900 via an Internet connection 912. The communication is received by call interface 902 therein. Interface 902, connected to operator telephones 112, includes the aforementioned ACD logic for distributing the call to an operator at one of telephones in a conventional manner. Calls are handled in the same manner as described above. The embodiments of the present invention are applied in a system including one or more IASPs 900, in the same manner as described above.

The communications systems described above may be implemented with in-band, feature group D (FGD) type signaling, SS7 out-of-band signaling or other signaling for communications between switches (including carrier switches). Where SS7 out-of-band signaling is used, the communications systems receive the call setup signals and call progress information (busy, ring-no-answer, number unavailable, answer supervision, etc.) coming from an SS7 signaling link, separate from the voice trunk.

The foregoing merely illustrates the principles of the invention. It will thus be appreciated that those skilled in the art will be able to devise numerous other arrangements that embody the principles of the invention and are thus within the spirit and scope of the invention.

For example, the invention is illustrated with an embodiment where a user utilizes the information assistance service to locate a movie theater to purchase tickets for a desired movie. However, the inventive information assistance service is equally applicable to conducting other searches and/or transactions. For instance, where a user in an information assistance call wants to purchase a pair of jeans of a particular brand, different information assistance providers may continually help the user to locate the clothing store carrying the desired jeans during the call, in accordance with the invention; where a user in an information assistance call wants to purchase floor tiles of a particular style, different information assistance providers may continually help the user to locate the home improvement store carrying the desired tiles during the call, in accordance with the invention; etc.

In addition, while in the description above, the communications system 10 is said to be an information assistance system, the present invention may be used in other types of voice communications systems that are subscription based and/or include accounts with multiple parties.

Finally, the communications systems and their components are disclosed herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

The invention claimed is:

1. A method for providing an information assistance service, comprising:
   receiving an information assistance request from a requester;
   conducting a search on a database in response to the request;
   retrieving a result based on said search on said database including connection at least one data sufficient for connecting said requester to a communications device associated with a desired party;
   storing a result of the search in association with the communication,
   wherein either one of or both a text or verbal exchange transcript included in said information assistance request and said retrieved result of connection data constitutes an information exchange stored in connection with said result;
   reviewing said information exchange stored in connection with said stored result, corresponding to at least a portion of the said text or verbal exchange transcript to derive a context of said information assistance request, said context being derived from, but not explicitly contained, in said information exchanges in the communication,
   wherein said context relates to, but is not the same as, said information assistance request and said connection data; and
   delivering at least one advertisement to said requester based on said derived context.

2. The method of claim 1 wherein the requester is reconnected to the information assistance provider after detection of a predetermined signal initiated by the requester.

3. The method of claim 1 wherein the connection data is a telephone number associated with the desired party.

4. The method of claim 1 wherein the information assistance request concerns a purchase of a product or a service.

5. The method of claim 4 wherein the desired party includes a provider of the product or the service.

6. The method of claim 1, further comprising the step of reviewing a stored requester profile containing requester preferences, wherein said advertisement delivered to said requester based on said derived context is further informed by said requester preferences.

7. The method of claim 1, further comprising the step of reviewing location information relating to said result, wherein said advertisement delivered to said requester based on said derived context is further informed by said location information relating to said result.

* * * * *